United States Patent [19]

Ikegawa et al.

[11] Patent Number: 4,839,861

[45] Date of Patent: Jun. 13, 1989

[54] INFORMATION RECORDING MEDIUM REWRITABLE BY UTILIZING TWO METASTABLE PHASES OF A RECORDING LAYER AND METHOD USING THE SAME

[75] Inventors: Sumio Ikegawa, Tokyo; Shuichi Komatsu, Yokohama; Shinji Arai, Chigasaki; Sumio Ashida, Tokyo; Nobuaki Yasuda, Zushi, all of Japan

[73] Assignee: Kabushiki Kaisha Toshiba, Kawasaki, Japan

[21] Appl. No.: 12,074

[22] Filed: Feb. 6, 1987

[30] Foreign Application Priority Data

Feb. 6, 1986 [JP] Japan .................................. 61-24508

[51] Int. Cl.$^4$ ...................... G11C 13/00; G11C 13/04; G11B 7/00
[52] U.S. Cl. .................................. 365/113; 365/106; 365/215; 365/127; 369/100
[58] Field of Search ........................ 365/113, 106, 215; 250/213 R; 430/945; 346/135.1; 369/100, 101, 275

[56] References Cited

U.S. PATENT DOCUMENTS

3,530,441 9/1970 Ovshinsky ........................... 365/113
4,527,173 7/1985 Gupta et al. ........................ 430/945

FOREIGN PATENT DOCUMENTS

0136801 10/1985 European Pat. Off. .
0158804 10/1985 European Pat. Off. .
59-218644 12/1984 Japan .
60-179952 9/1985 Japan .
60-179953 9/1985 Japan .
60-179954 9/1985 Japan .
60-177446 11/1985 Japan .
61-9542 1/1986 Japan .

OTHER PUBLICATIONS

J. Chem. Phys., vol. 36, pp. 1870–1874, 1962 by H. L. Lou and W. Klement.
Trans AIME, vol. 242, p. 597, 1968 by B. C. Giessen, U. Wolff and N. J. Grant.
J. Chem. Phys., vol. 39, pp. 1613–1614, 1963 by C. B. Jordan.

*Primary Examiner*—Stuart N. Hecker
*Assistant Examiner*—Alfonso Garcia
*Attorney, Agent, or Firm*—Oblon, Fisher, Spivak, McClelland & Maier

[57] ABSTRACT

A rewritable information recording medium which has a recording layer containing a Group I transition element and a Group IV representative elements of the Periodic Table as two principal element and a support substrate for physically supporting the recording layer, and an information-write, -read, and erase method using this recording medium. When the recording layer is immediately cooled after it is heated up to near a eutectic temperature of the two principal elements, two metastable phases having different energy levels appear. A state in the first metastable phase of the higher energy level has a reflectivity sufficiently higher than that of a state of a mixed phase including the second metastable phase of the lower energy level, or that of the equilibrium state. The state in the first metastable phase can be obtained by heating a recording layer in another state by light beam irradiation. A portion in the first metastable state is cooled after it is heated to a temperature lower than that for obtaining the first metastable phase, so that it can be converted to a state of the low reflectivity, i.e., a state of a mixed phase including the second metastable phase or to the equilibrium state.

27 Claims, 12 Drawing Sheets

F I G. 7
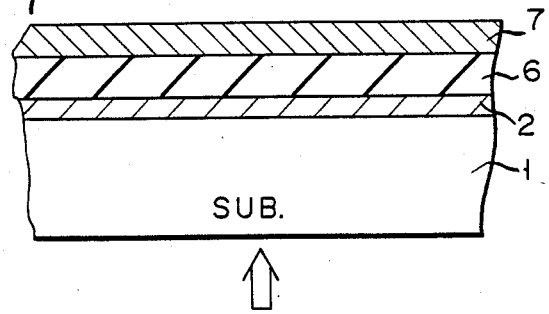
F I G. 8
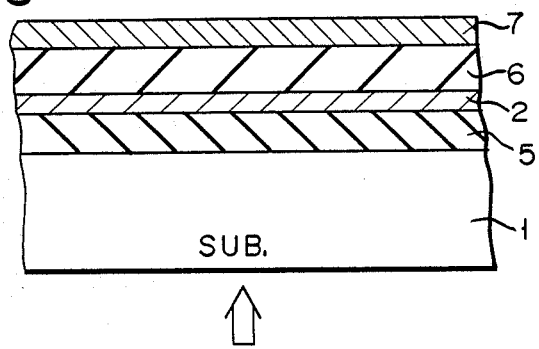
F I G. 9
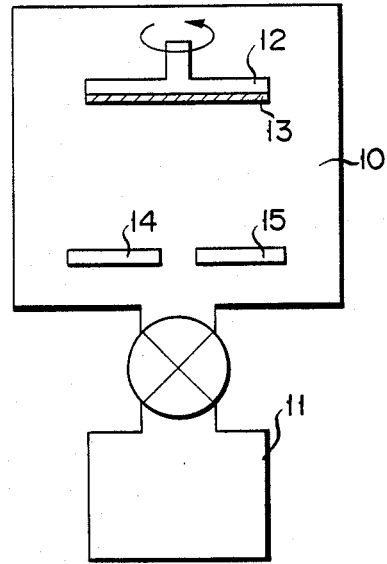

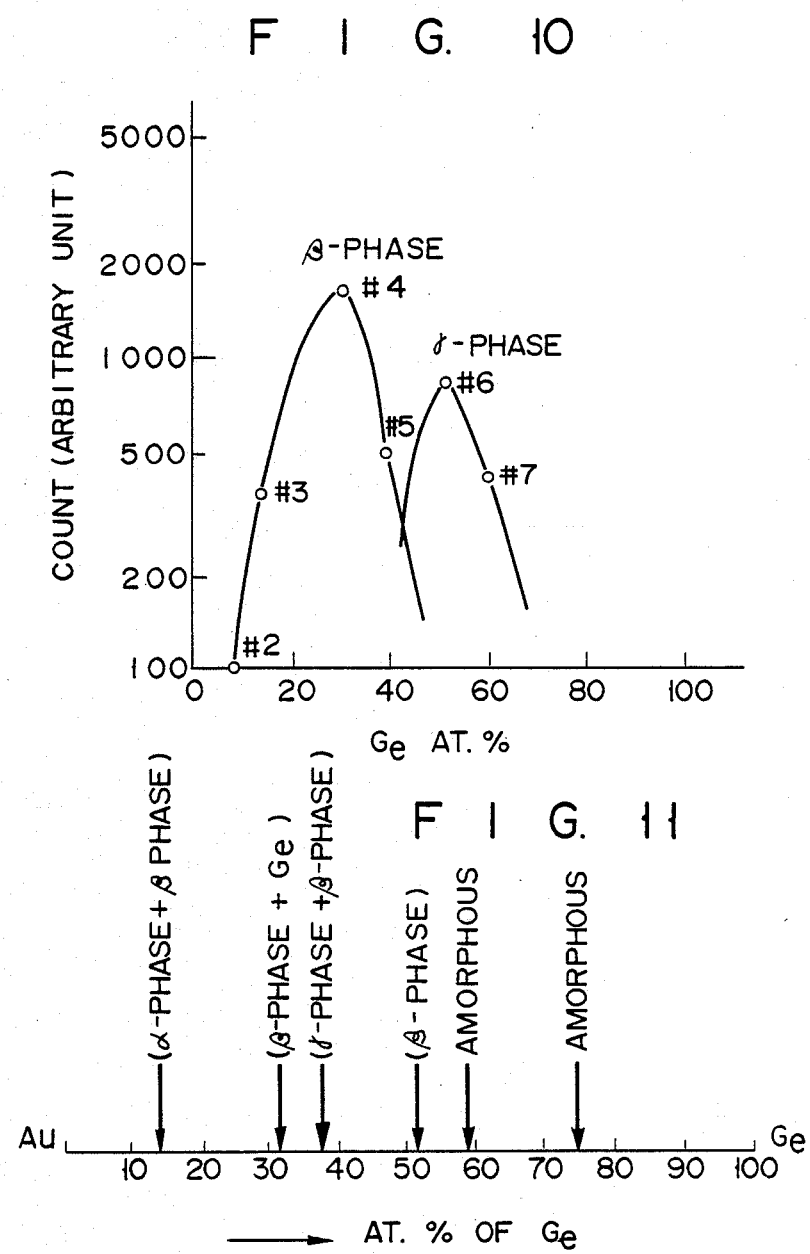

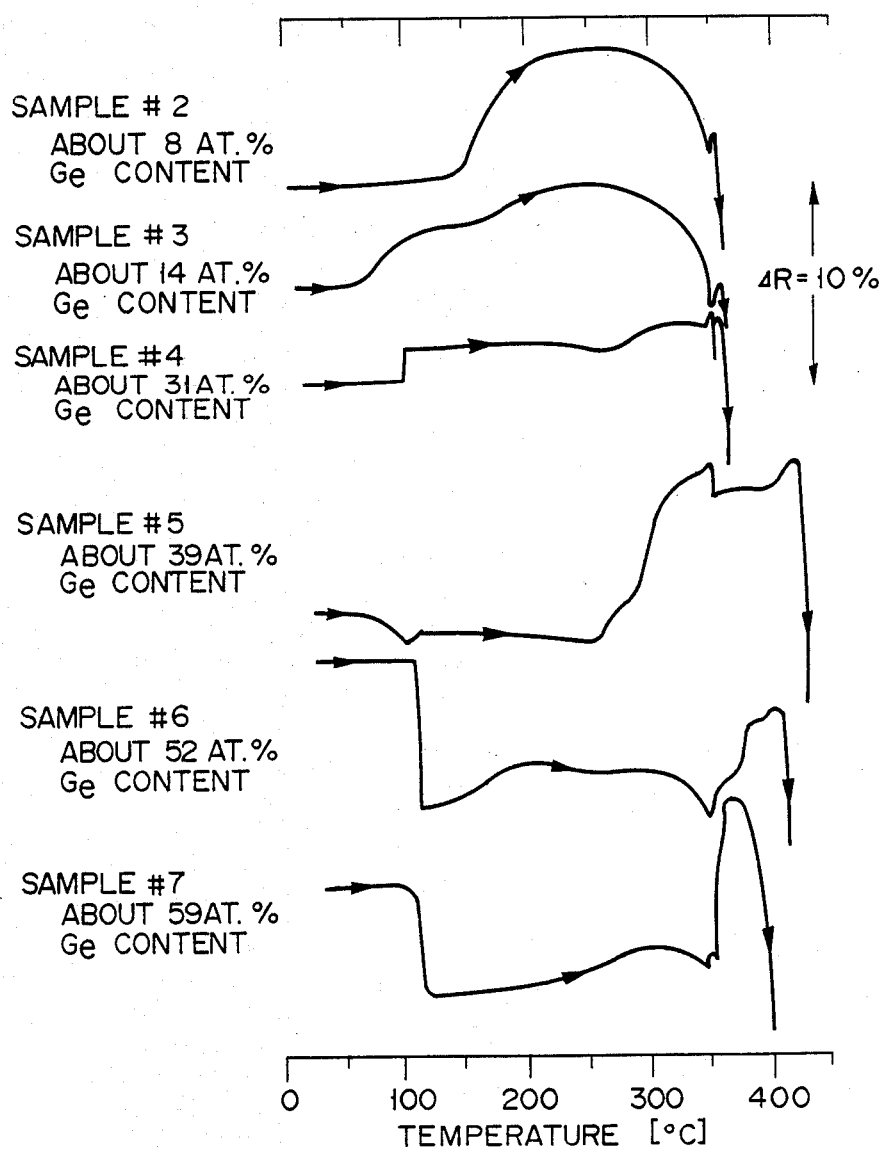

INFORMATION RECORDING MEDIUM REWRITABLE BY UTILIZING TWO METASTABLE PHASES OF A RECORDING LAYER AND METHOD USING THE SAME

BACKGROUND OF THE INVENTION

1. Field of the Invention

The present invention relates to an information recording medium and, more particularly, to an erasable recording medium in which information is written by use of a light beam such as a laser beam, the written information itself being read also by such a beam.

The present invention also relates to a method of writing information in the information recording medium and reading out the written information therefrom.

2. Description of the Prior Art

An optical disc is a recording medium which is irradiated by a light beam such as a laser beam, in order to write information thereinto, as well as to read the information written there, by means of reflected light. Conventional examples of erasable optical discs are as follows.

The first type of conventional optical disc utilizes a magneto-optical effect and has a thin amorphous film consisting of a rare earth and a transition metal as a recording layer. In an optical disc of this type, a recording layer is irradiated by a laser beam while a bias magnetic field is being applied thereto, so that reversal of magnetization occurs locally in the irradiated portion, thereby enabling a write operation to be performed. In order to read the information, the recording layer is irradiated by a laser beam, and a very slight Kerr rotation of the reflected light is detected. Therefore, the required optical system becomes complex, and since a magnetic field applying means is required, the necessary write/read system becomes complex and expensive.

The second type of conventional optical disc utilizes a phase transition in the recording layer, to perform a write/erase operation. This disc has a thin film containing Chalcogen such as Te or Se as the recording layer. In this type of optical disc, a difference in reflectivity between a written-in portion and a nonwritten-in portion of the recording layer is detected, in order to read the information written therein, thus eliminating the problem associated with the first type of optical disc. For this reason, in addition to using a thin film containing Chalcogen, various proposals and extensive studies have been made and reported, as described below, concerning the second type of optical disc.

(a) Japanese Patent Disclosure (Kokai) No. 60-179952 describes a rewritable optical disc medium including a thin Au-Te alloy film, having a predetermined composition ratio, as a recording layer.

(b) Japanese Patent Disclosure (Kokai) No. 60-179953 describes an optical disc medium including a thin Ag-Te alloy film, having a predetermined composition ratio, as a recording layer.

(c) Japanese Patent Disclosure (Kokai) No. 60-179954 describes an optical disc including a thin Au-M-Sb alloy film, having a predetermined composition ratio (M is Ag, Cu, Pd, Pt, Al, Si, Ge, Ga, Sn, Te, Se, Bi), as a recording layer.

(d) Japanese Patent Disclosure (Kokai) No. 60-177446 describes an optical disc including a thin In-Sb-M alloy film (M is Au, Ag, Cu, Pd, Pt, Al, Si, Ge, Ga, Sn, Te, Se, Bi) as a recording layer.

According to the following references (e), (f), and (g), when alloy films having compositions corresponding to those of the recording layers disclosed in the above references (a), (b), (c), and (d) are rapidly cooled from the liquid state, they present a metastable phase of a simple cubic lattice structure. These descriptions teach the following:

In the recording mediums described in references (a), (b), (c), and (d), the recording layer is melted by light beam irradiation, and is then rapidly cooled to obtain a metastable state of a simple cubic lattice structure, thereby enhancing the reflectivity at the irradiated portion, to enable information to be written therein. On the other hand, when the written information is to be erased, the recording layer is brought into an equilibrium state of mixed phase, i.e., a low reflectivity state.

Other studies include:

(e) H. L. Lou and W. Klement, Jr.: J. Chem. Phys. vol. 36, pp 1870 to 1874 (1962), (f) B. C. Giessen, U. Wolff, N. J. Grant: Trans. AIME, vol. 242, p. 597 (1968), (g) C. B. Jordan: J. Chem. Phys. vol. 39, pp 1613 to 1614 (1963)

However, the second type of optical disc, i.e., the recording medium utilizing a phase transition of the recording layer, to perform the information write/erase operation also possesses the following drawbacks.

Specifically, when a thin film containing Chalcogen is used as a recording layer, the problem of toxicity of the Chalcogen arises, wherein reversibility is gradually lost when it is repeatedly heated by light beam irradiation. In addition, composition margin is narrow because the recording layer is a thin multicomponent film. The recording layer is formed by a vacuum evaporation, resulting in poor reproducibility and mass-productibility. Furthermore, in order to increase write speed, the recording medium is crystalline in its initial state and amorphous in its written state. Therefore, in order to actually use the recording layer as a recording medium, the recording layer must first be annealed, and then crystallized (initial crystallization).

On the other hand, the recording mediums described in the references (a) to (d) possess the following drawbacks:

In these recording mediums, a written portion in the recording layer is in the metastable state of a simple cubic lattice structure, while an erased portion therein is in the equilibrium state. This equilibrium state is a mixed phase consisting of a face-centered cubic structure (Au, Ag), a hexagonal structure (Te) wherein atoms are arranged in the form of a chain, and a rohmbic structure ($AuTe_2$, $Ag_2Te$). These three structures differ from the simple cubic lattice structure which is in the metastable state. They also differ from a dense packing structure. Such a significant difference in crystal structure, between the written and erased states, means that diffusion length of atoms is very large when a phase transition occurs during the write/erase operation. Therefore, a considerable length of time is required to write or erase information by use of a light beam, resulting in an abnormal write/erase operation when a disc (i.e., a recording medium) is rotated at high speed.

Generally, the thin films used as recording layers, as described in references (a) to (d), are formed by a practical vacuum evaporation or by use of a sputtering method. However the recording layers formed by these methods are not in the above-mentioned equilibrium state. They are in a metastable state other than the simple cubic lattice structure. The reflectivity of the recording layer in the as-deposited metastable state is lower than that of the simple cubic lattice structure in the metastable state as the written state, but higher than that of the equilibrium state as the erased state. Therefore, as in the case of the thin Chalcogen film layer described above, in order that the recording layer can be used as the recording medium, it must first be annealed, and a step of crystallizing (initial crystallization) or one of obtaining the equilibrium state equal to the erased state (initial equilibrium process) is also required.

Furthermore, since major components of the recording layers described in references (a) to (d) are Te and Sb, problems of toxicity and poor resistance to environment (heat, humidity, oxidation etc.) arise, as in the case of the thin Chalcogen film.

SUMMARY OF THE INVENTION

It is a first object of the present invention to provide an information recording medium capable of eliminating the above conventional problems and, more specifically, to provide an information recording medium which can be rewritten on, is superior in resistance to corrosion and environment, has superior storage life, is free from toxicity, and is superior in regard to reproducibility and mass-productibility as regards film formation, and which can perform the write/erase operation at high speed.

It is a second object of the present invention to provide a method suitable for writing information in the above recording medium, and for reading or erasing the information written therein.

In order to achieve the above first object, a recording layer containing a transition element of Group I and a representative element of Group IV of the Periodic Table as two main elements is used in the recording medium of the present invention. The recording layer is heated to around the eutectic temperature of the two main elements, and is then rapidly cooled, thereby obtaining two metastable phases having different energy levels. When in the state of the first metastable phase having a higher energy level, the reflectivity is higher than when in the thermal equilibrium state. The mixed phase state including the second metastable phase having a lower energy level and closer to the thermal equilibrium state than the first metastable state the reflectivity is sufficiently lower when of the first metastable state. In addition, when the recording layer is cooled with a supercooling factor lower than the factor with which the layer is cooled to obtain the first metastable phase state, the first metastable phase state changes. More specifically, when the layer is first heated to a lower temperature and then cooled, or when the layer is cooled at a lower speed, this state becomes similar to an equilibrium state or a mixed phase state close to an equilibrium state including the second metastable state. As a result, the reflectivity of the recording layer will decrease. An example of a recording layer having such a characteristics is a thin Au-Ge binary alloy film.

In order to achieve the second object of the invention, the first metastable phase of the recording layer is adopted as the written state, and the equilibrium state or mixed phase including the second metastable phase is adopted as the erased state. Therefore, in order to perform the write operation, the recording layer is irradiated by a light beam, heated, and then rapidly cooled, so that the irradiated portion is brought into the first metastable state (high reflectivity) with a high energy level. The read operation re the written information is performed in the conventional manner, i.e., the recording medium is irradiated with a beam having lower power than that used in the write operation, and a difference between the intensities of light reflected from the written portion and that from the nonwritten portion or the erased portion is detected. The erase operation re the written information is performed in such a way that the recording layer is heated to a temperature lower than that occurring during the write operation, is cooled, and the portion of the recording layer to be erased is caused to transform from the first metastable state (write state) to the equilibrium state or the mixed phase state including the second metastable phase and close to the equilibrium state.

The present invention will now be described in detail below.

If the recording layer according to the present invention includes a typical element of Group IV of the Periodic Table, in a certain ratio, it is brought into the metastable state described above when it is heated and then rapidly cooled. A crystal structure in this metastable state is not a simple cubic lattice structure in the conventional written state described in the above-mentioned references (a) to (d). For example, in the case of the Au-Ge binary alloy, the first metastable phase having a higher energy level is a tetragonal structure ($\gamma$-phase), the second metastable phase having a lower energy level is a hexagonal close-packed structure ($\beta$-phase), and the thermal equilibrium state is a face-centered cubic structure ($\alpha$-phase) + a diamond structure (Ge).

When the recording layer having the above characteristics is heated by irradiation of a light beam, to near the eutectic temperature of the both elements, and is then rapidly cooled, the irradiated portion is brought into the first metastable state, and its crystal grain size is enlarged to increase its reflectivity. In addition, since the state is maintained near room temperature, the irradiated portion can serve as a written portion, and can be read in the conventional manner.

When the written portion in the recording layer according to the present invention is irradiated by a light beam having a power smaller per unit area than that used in the write operation, or is heated at a lower temperature than during the write operation, is then cooled, it is brought from the first metastable state into the equilibrium state or the mixed phase state including the second metastable state and close to the equilibrium state. Thus, the reflectivity of the layer is decreased, and the erase state can be obtained.

The crystal structures of the above written and erased states are different from each other, but the $\gamma$-, $\beta$-, and $\alpha$-phases are all dense stacking structures, although these stacking structures are slightly different. Therefore, diffusion length of the atoms in the layer is small when a phase transforms during the write and erase operation. As a result, the write/erase operation can be performed in a short period of time.

When the recording layer according to the present invention is rapidly cooled not only from the melted liquid phase but from the gas phase or the solid/liquid mixture state which is not a complete melting state, the metastable state is obtained. For example, in the case where the recording layer is formed by sputtering, it is automatically cooled when it is deposited from the gas phase state, in the sputtering step, and assumes a metastable state. However, the metastable phase state is not only the first thereof having high reflectivity (high energy level), but also the mixed phase state including the second metastable phase having a lower energy level and close to the equilibrium state. Therefore, the recording layer as-deposited has substantially the same reflectivity as that of the erased portion. This means that the initial equilibrium process after film formation of the recording layer and prior to actual use of the recording medium is not required to be performed.

The recording medium according to the present invention is superior as regards safety during manufacture, because the main components of the recording layer, i.e., both a transition element of Group I and a representative element of Group IV, are not toxic. It is also superior in resistance to corrosion and environment due to the characteristics of the thin alloy film having these elements as main components. In addition, since the recording layer can be formed as a binary component film in which the composition margin is wide, this results in good reproducibility.

BRIEF DESCRIPTION OF THE DRAWINGS

FIGS. 3 to 8 are sectional views of other embodiments of the structure of the recording medium according to the present invention;

FIG. 9 is a schematic view of an example of a film formation apparatus for manufacturing the recording medium according to the present invention;

FIG. 10 is a graph for explaining how a main peak shows composition dependency when X-ray diffraction is performed for the as-deposited recording layer according to the present invention;

FIG. 11 is a graph for explaining how a crystal structure of the recording layer as-deposited according to the present invention shows composition dependency;

FIG. 12 is a graph showing changes in the reflectivity of recording layers, according to the present invention, having different compositions upon temperature changes;

PREFERRED EMBODIMENT OF THE INVENTION

An embodiment according to the present invention using Au as a transition element of Group I and Ge as a representative element of Group IV of the Periodic Table will now be described below.

When a mass of Au-Ge alloy is rapidly cooled from a melted state, a metastable crystal structure which cannot be obtained in an equilibrium state, i.e., a $\beta$phase (hexagonal close-packed structure) or a $\gamma$-phase (tetragonal structure), is then obtained. This fact has already been described in a reference Trans. AIME; 233, No. 11 (nov 1965); pp 2,014 to 2,017 by Aantharaman, T. R., Huey-Lin Lou, and Klement, W. Jr. This reference also presents a phase diagram illustrating a metastable state. However, this known fact was observed in a mass of the alloy, not in a thin film made of the alloy. Only a part of the phase diagram is actually based on the actual observation.

Figure 1:
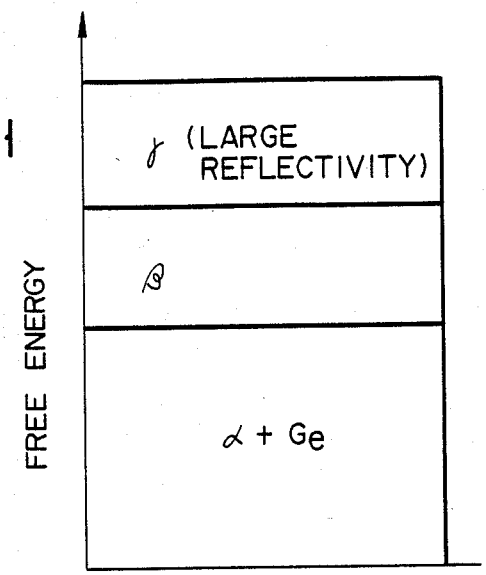
FIG. 1 is a view showing the energy level of a metastable state existing in a thin Au-Ge binary alloy film, upon rapid cooling, as compared with a thermal equilibrium state.

The present inventors found that a $\beta$-phase or a $\gamma$-phase as a metastable phase of an Au-Ge alloy is also obtained in a thin film formed by sputtering or the like, these metastable states being obtained particularly when the Ge content is 8 to 65%. The present inventors also found that in the case of a thin film, the $\beta$-phase or $\gamma$-phase is obtained not only when the thin film is rapidly cooled from the melted state, but also when it is rapidly cooled from the gas phase, as in the case with sputtering or from temperature range between the eutectic temperature and a liquidus line temperature. It was also found that these metastable phases reversibly transtorm between themselves or with an $\alpha$-phase + Ge as an equilibrium state if suitable annealing conditions are selected. Note that the thermodynamic stability of the $\gamma$-and $\beta$-phases as a metastable phase is shown compared with the $\alpha$-phase + Ge as an equilibrium state, in FIG. 1. Among them, the $\gamma$-phase has sufficiently high reflectivity as compared with a thermal equilibrium state ($\alpha$-phase + Ge). In addition, a mixed phase ($\beta$-phase + Ge) including the $\beta$-phase and closer to the thermal equilibrium state than the $\gamma$-phase has sufficiently low reflectivity as compared with the $\gamma$-phase.

The following facts are found by examining changes in the thin Au-Ge alloy film, caused by the annealing.

First, the $\beta$- and $\gamma$-phases are very stable below 100° C.

Second, when the Au-Ge alloy film in a state including the $\beta$-phase is heated near the eutectic temperature (356° C.), the reflectivity is greatly increased. When the $\gamma$-phase as-deposit is annealed in a similar manner, the reflectivity is also increased. This is considered to be attributable to crystal grain growth upon annealing.

Third, when the $\beta$- and $\gamma$-phases are heated between 100° C. and the eutectic temperature, for a long period of time, they transform to an $\alpha$-phase + Ge state as a thermal equilibrium state. The reflectivity of the film in this thermal equilibrium state is also sufficiently small as compared with that of the $\gamma$-phase.

Changes in the thin Au-Ge alloy film, caused by laser beam irradiation, were examined on the basis of the above new facts, and it was confirmed that the film can be used as a recording layer of a erasable or rewritable recording medium. In an embodiment to be described below, on the basis of the above new facts, the $\gamma$-phase of the thin Au-Ge alloy film is the written state, and the $\ominus$-phase + Ge or the $\alpha$-phase + Ge state is the erased state, thereby constituting a rewritable information recording medium.

Figure 2:
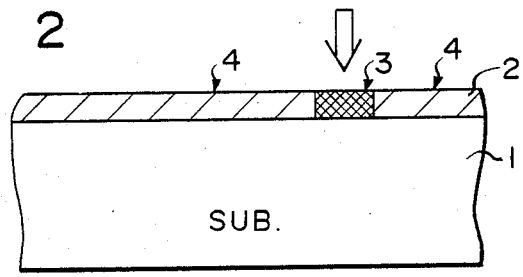
FIG. 2 is a sectional view of a basic structure, a written state, and an erased state of a recording medium according to the present invention.

FIG. 2 is a sectional view of a basic structure of the recording medium according to an embodiment of the present invention. In FIG. 2, reference numeral 1 denotes a substrate formed of an organic resin, glass, quartz, or the like. Recording layer 2 formed of a thin Au-Ge alloy film is formed on substrate 1. Write, read, and erase operations with respect to the recording medium are performed as follows:

A write operation is performed such that layer 2 is irradiated by a laser beam focused onto a spot having a diameter of about 1 $\mu$m, heated to a temperature around the eutectic temperature, e.g., between the eutectic temperature and the melting temperature, and then rapidly cooled. Thus, irradiated portion 3 transforms to a state having high reflectivity, to enable performing of the write operation. Generally, when a thin film is irradiated by the laser beam and then naturally cooled, a very high cooling rate of $10^{8\circ}$ C./sec or more can be achieved through a self-cooling effect. It can be assumed that the written portion 3 of layer 2 is obtained since this portion has been cooled to below room temperature due to the supercooling of said rapid cooling, while remaining in $\beta$-phase state, which has been established at the eutectic point by application of the laser beam, and while maintaining high reflectivity. When portion 3 was observed by a microscope, its surface was flat, and no macro-deformation in shape was found.

An erase operation is performed when layer 2, in which information is written, in this manner is irradiated by a laser beam having a lower power than that used in the write operation, and which is relatively and continuously moved with respect to the medium. It has been confirmed that when layer 2 is heated to a temperature lower than that for the write-operation, e.g., to not more than the eutectic temperature, the written state disappears and the reflectivity returns to the original low state ($\beta$-phase + Ge), so that layer 2 is erasable. The laser beam used for the erase operation may have a larger beam size and a longer pulse width than those used in the write operation. This is, a beam having smaller power per unit area on layer 2 is suitable. In addition, the erase operation may be performed by annealing the entire recording medium by use of an electric furnace or the like, instead of using the laser beam. More specifically, when layer 2 is heated to a temperature lower than that for the write operation, and is gradually cooled to a state where it has the same reflectivity as that before the write operation, information written therein can be erased. In addition, the portion erased in this manner can be irradiated by the laser beam, under the same conditions as described above, to again enable performing of the write operation; i.e., rewriting can be performed on this medium. When the erased state is the $\beta$-phase + Ge, the rewrite operation is especially easy, and when it is the $\alpha$-phase + Ge, the rewrite operation is possible under suitable conditions.

A read operation is performed when layer 2 is irradiated by a laser beam having a lower power than that for the write operation, and changes in the intensity of light reflected from layer 2 are detected, by utilizing a difference in reflectivities of written portion 3 and nonwritten-in portion or erased portion 4. The difference in reflectivity is due to crystal structure and crystal grain size.

Note that Japanese Patent Disclosure (Kokai) No. 59-218644 describes a recording layer of a thin film containing Au, Ge, and Se as an example of optical recording medium using Au and Ge. However, since the recording medium is irradiated by the laser beam, to form a bubble (projection) on the recording layer, to enable performing of the write operation, it is principally nonerasable, and hence cannot be a rewritable medium. The present invention is similar to the above known example, because the composition of layer 2 includes Au and Ge. However, the recording mechanism of the present invention is essentially different from that of the above known example, because a bubble is not formed during the write operation, and the reflectivity is locally changed while layer 2 remaining flat.

In the above description, the laser beam is radiated onto the surface of layer 2, but it may alternatively be radiated onto the surface of substrate 1 if substrate 1 is transparent to the laser beam.

Figure 3:
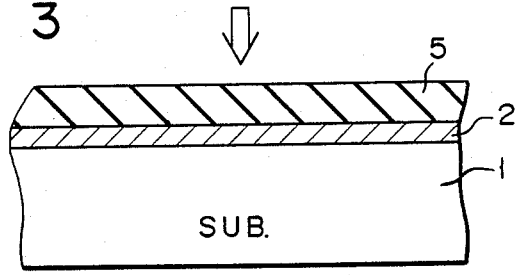
Figure 4:
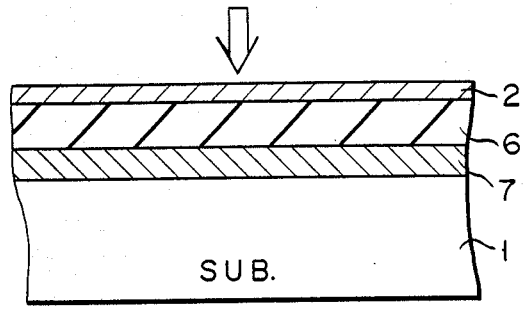
Figure 5:
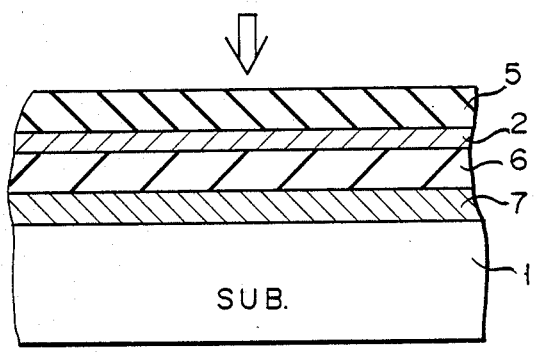

The recording medium according to the present invention can be advantageous if a layer on substrate 1, as is shown in FIG. 2, is a one-layer structure formed only of layer 2. However, by combining suitable layers with layer 2, to obtain a multilayer structure, various characteristics can be improved. Embodiments of such multilayer structures are shown in FIGS. 3 to 8. In the drawings, FIGS. 3 to 5 show an embodiment wherein the laser beam is irradiated onto the surface of layer 2, as in the case with FIG. 2, and FIGS. 6 to 8 show an embodiment wherein the laser beam is irradiated onto the surface of substrate 1. In each of FIGS. 3 to 8, an arrow indicates the direction of irradiation of the laser beam.

Figure 6:
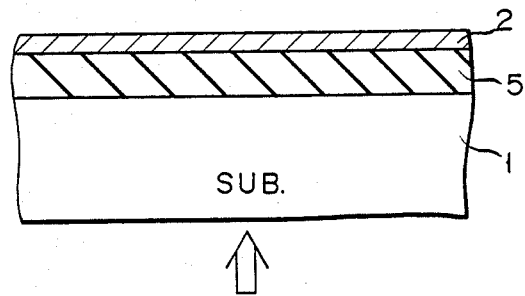

The recording medium shown in FIGS. 3 and 6 is a two-layer structure wherein transparent dielectric film 5 is provided on a laser beam-incident side surface of layer 2. Film 5 is sufficiently transparent to enable the transmitting of the laser beam therethrough, and is preferably formed of a thermally stable material such as an oxide, e.g., silicon dioxide or titanium dioxide, or a nitride, e.g., silicon nitride or aluminum nitride.

With film 5 being provided as described above, oxidation of layer 2 (oxidation caused by the introduction of water from substrate 1, in the case of FIG. 5) can be prevented. In addition, it has been confirmed that a difference between the reflectivities (to be referred to as reflectivity change hereinafter) of the written portion and the nonwritten portion or erased portion is enhanced by the provision of film 5. Therefore, a function of film 5, in this case, is different from that of a thin transparent dielectric film provided for a conventional magneto-optical recording medium. This is, the thin transparent dielectric film of the conventional magneto-optical recording medium increases the rotatory-polarization-angle of reflected light, while that in the above embodiment contributes to an improvement in the S/N ratio of a read output, by increasing a relative change in reflectivity.

In the above embodiment, the reflectivity change is enhanced, because the incident light is repeatedly reflected on both interfaces of film 5 and repeatedly passes through the transparent dielectric body, to generate multi-interference. Due to this multi-interference phenomenon, the reflectivity change in the written and erased portions is enhanced. In addition, in the above structure, the reflectivity itself is decreased, and the light energy absorbed in layer 2 with respect to a predetermined amount of incident laser beam, is increased, thereby contributing to an improvement in the write-sensitivity.

The embodiments shown in FIGS. 4 and 7 adopt a three-layer structure wherein thin transparent dielectric film 6 and reflecting film 7 are sequentially stacked on one side, i.e., on a surface opposite to that on which the laser beam is incident. Film 6 may be the same as the film 5 of the FIGS. 2 and 5. In addition, a thin aluminum film or a thin gold film may be used as film 7.

In the three-layer structure of FIGS. 4 and 7 described above, an enhancement in the reflectivity change caused by the multi-interference can be obtained, because the incident light transmitted through layer 2 repeatedly passes through film 6. However, since the incident light is reflected on the surface of layer 2, in this case, only part of the light is introduced inside transparent dielectric film 6. Therefore, when the laser beam is irradiated onto the surface of layer 2, a smaller enhancement in the reflectivity change occurs in the case in FIG. 4 than is the case in FIG. 3. However, when the laser beam is irradiated onto the surface of layer 2 through substrate 1, the three-layer structure of FIG. 7 produces a greater enhancement effect than that of the two-layer structure of FIG. 6. This is because the difference in refractive index between film 5 and substrate 1 is small, so that reflection at the interface of film 5 and substrate 1 of FIG. 6 is not sufficient, and multi-interference therefore cannot be effectively performed.

FIG. 5 shows an embodiment of a four-layer structure combining the structures of FIGS. 3 and 4. FIG. 8 shows an embodiment of a four-layer structure combining the structures of FIGS. 6 and 7. In these embodiments of the four-layer structure, since multi-interference is performed in two layers 5 and 6, the change in reflectivity is more effectively enhanced; consequently, an improvement in read signal magnitude can be expected. Therefore, according to the above embodiments, the degree of freedom of the S/N ratio control is widened when a device is actually designed, resulting in greater ease in the designing of the device.

Note that the structures of FIGS. 2 to 8 are effective not only in the case where an Au-Ge alloy is used as layer 2, but also in any recording layer within a range of claimed invention containing a transition element of Group I and a representative element of Group IV of the Periodic Table as its two main elements.

Detailed requirements included in the above embodiments will now be described below.

The wavelength of the laser beam is not limited, but light of 630 to 830 nm generated by an He-Ne laser or a semiconductor laser is considered the most desirable. Using such a wavelength range, an optimized multi-layer structure as is shown in FIGS. 3 to 8 is preferable to a single layer 2 formed of a thin Au-Ge alloy film. By using these multilayer structures, since reflectivity changes more accurately accordance with a difference between complex indexes of refraction at the written and nonwritten portions or between those of the written and erased portions, the read operation with a good S/N ratio can be performed.

In a recording medium having a multilayer structure, optimal conditions such as a film thickness are determined by the materials, especially complex index of refraction, used to form layer 2 or films 5 and 6. For example, when the recording layer is a thin Au-Ge alloy film, the thin transparent dielectric film is a thin silicon nitride film, and when the laser beam whose wavelength lies within the above practical range is used, the optimal range of thickness for film 5, at the laser beam incident side in FIGS. 2 to 8, is 50 to 170 nm. When a protecting effect offered by films 5 and 6 to the recording layer 2 is taken into consideration, a silicon nitride film is especially suitable because a stable, dense, and high-quality film can be easily obtained, and an adjacent film does not become oxidized.

The optimal film thickness of the recording layer formed of a thin Au-Ge alloy film is determined by thermal conditions existing during the write operation, as well as by the optical characteristics to be desired. If the film is too thick, the absorption energy per unit volume during laser beam irradiation for the write operation becomes small, and heat conducted rapidly into the film becomes considerable, resulting in degradation in write-sensitivity. In order to obtain a recording medium having a practical recording sensitivity, the film thickness is preferably 50 nm or less. If, however, the film thickness of layer 2 is decreased to below 10 nm, light-transmittance is increased and the light-energy absorbency at the recording layer is decreased, also resulting in degradation in the write-sensitivity.

On the other hand, in the multilayer structures in FIGS. 4, 5, and FIGS. 7, 8, layer 2 preferably transmits suitable amount of light to allow the multi-interference inside film 6 to perform its function completely. Further, the film thickness of the recording layer formed of a thin Au-Ge alloy film is preferably 10 to 50 nm.

When the above-described recording layer formed of a thin Au-Ge alloy film is formed by sputtering, the layer as-deposited is in a $\beta$-phase, which is one of the metastable states, and is in an aggregate state of microcrystals. This as-deposited state is more close to the equilibrium state, and the reflectivity is very close to that of the erased state. Therefore, the step of initial crystallization or the performing of the initial equilibrium process may be omitted.

As has been described above, the step of performing the initial equilibrium process is unnecessary in principle, according to the present invention, but practically speaking, a slight difference in reflectivity between the as-deposited and erased states of the recording layer may occur. In such a case, when the recording layer as-deposited is used as a recording medium, the reflectivity differs between the nonwritten and erased portions, and one of these portions makes noise. For this reason, when the nonwritten and erased portions are mixed on a single recording medium, especially on the same track, the S/N ratio of the read output is degraded.

Therefore, it is preferable to perform the initial equilibrium process by annealing after the recording layer has been formed. This annealing may be performed by use of an electric furnace, laser beam irradiation, or the like. During the annealing, the recording layer should preferably be heated to below the eutectic temperature. If it is heated to above the eutectic temperature, e.g., up to fusing point, it will completely melt and deform. In the case where the recording layer is heated to near the above temperature, even then, it may partially melt and deform.

As a method of forming a thin alloy film consisting of more than two components, the sputtering method is superior in regard to reproducibility and mass-producibility. Therefore, it is a great practical advantage in using the sputtering method for forming the recording layer as in the present invention, when compared with the case where a vacuum vapor evaporation method having the following drawbacks must be used.

More specifically, when the vacuum vapor evaporation method is used, and many components evaporate from a single evaporation source, a composition gradient tends to occur in a direction perpendicular to a surface of the formed film, because the vapor pressures of respective components are different. Further, it is difficult to realize the same composition, with a view to achieving good reproducibility. In order to eliminate this problem, evaporation sources may be provided by a number of components, thereby resulting in a complex film-formation apparatus. In addition, since composition must be controlled by temperature control of each of the evaporation sources, precise control is difficult to achieve. Another problem is that when optical discs are to be continuously manufactured by transferring them from one film-forming operation to the next, the temperature of the evaporation source is successively lowered and then elevated again for the next film-formation, so that time is required to stabilize the evaporation rate. In order to eliminate this problem, if the temperature of the evaporation source is not lowered from the end of one film-formation process to the beginning of the next, in order to maintain the same evaporation speed, some waste occurs in the number of metal elements used.

On the other hand, when a sputtering method is adopted, by using an alloy target whose composition is preadjusted, and by constantly controlling the sputtering gas pressure and the application power, film formation without the presence of a composition gradient can be achieved, having good reproducibility in regard to composition and film quality. When multi-source sputtering is used, the composition can be easily controlled by controlling the power supplied to each target. During mass-production, any scattering of metal elements is immediately stopped by cutting off the power supply, so that the time required between the end of one film-formation process and the beginning of the next is short, and metal elements are not wasted. Therefore, the above method is superior in regard to mass-producibility. In particular, when a thin Au-Ge alloy film is to be formed, mass-producibility is further improved because of the wide composition margin. Note that the film-forming method used to form the recording layer according to the present invention is not limited to sputtering; vacuum evaporation may be used instead. In vacuum evaporation, the step of initial crystallization or the initial equilibrium of films may be required.

EXAMPLE 1 (Formation of Au-Ge recording layer, crystal structure analysis, and thermal transition, etc.)

<Formation of recording layer>

Using a 5" Au target and a 5" Ge target, thin Au-Ge alloy films of various compositions were formed by binary-simultaneous-magnetron-sputtering. The sputtering gas used as an Ar gas, the pressure was 5 mTorr, and the flow-rate was 70 SCCM. The substrate was rotated at 60 rpm during the layer-formation. The deposition rate was 5 to 25 nm/min.

FIG. 9 is a schematic view of an arrangement of a film-formation apparatus used in this Example. In FIG. 9, reference numeral 10 denotes a vacuum chamber. Evacuating system 11 including a cryopump is connected to chamber 10. Substrate holder 12 is provided inside chamber 10, and recording medium substrate 13 (substrate 1 in FIGS. 2 to 8) is held in holder 12. Targets 14 and 15 are arranged so as to oppose holder 12. In addition, a magnet (not shown) is provided to obtain a magnetron mode, and radio-frequency electric power is applied to targets 14 and 15.

<Cyrstal structure analysis>

For respective thin Au-Ge alloy films obtained in the above manner, crystal structures (as-deposited) and those after predetermined annealing were examined by X-ray diffraction. Table 1 shows results of the crystal structure analysis performed for various thin Au-Ge alloy films having a film thickness of 200 nm, formed on a quartz substrate, and having different Ge contents.

TABLE 1

| Sample | Composition (Ge at. %) | Crystal Structure | | |
|---|---|---|---|---|
| | | As-deposit | 150° C./10 min After Annealing | 300° C./10 min After Annealing |
| #1 | 1 | α-phase | α-phase | α-phase |
| #2 | 8 | α-phase + β-phase | α-phase + Ge | α-phase + Ge |
| #3 | 14 | β-phase + α-phase | α-phase + Ge + β-phase | α-phase + Ge |
| #4 | 31 | β-phase | α-phase + Ge + β-phase | α-phase + Ge |
| #5 | 39 | β-phase | α-phase + Ge | α-phase + Ge |
| #6 | 52 | γ-phase | α-phase + Ge | α-phase + Ge |
| #7 | 59 | γ-phase | α-phase + Ge | α-phase + Ge |
| #8 | 75 | Amorphous | α-phase + Ge | α-phase + Ge |

Furthermore, in the case of the recording layer (a thickness of 200 nm) as-deposited of a thin Au-Ge alloy film, the level-dependency of the main X-ray diffraction peak corresponding to β- and γ-phases structures on an Au-Ge alloy composition was examined. FIG. 10 shows the results. In FIG. 10, circles denote plots corresponding to samples #2 to #7, respectively.

From the above results, in as-sputtered Au-Ge alloy films, which were quenched from the vapor, metastable crystal structures (β- and γ- phases) were observed. The metastable phases becomes a thermally equilibrious mixed phase (α-phase + Ge) by being annealed at 300° C. for 10 minutes or more.

However, since the write-sensitivity is low when the film thickness is 200 nm, as described above, the film thickness of the recording layer is, in practice, preferably less than 50 nm. Therefore, the film thickness of the recording layer was formed as thin as 10 nm, and perform the same tests using X-ray diffraction or electron beam diffraction. As a result, as is shown in FIG. 11, it has been confirmed that the metastable crystal structure can also be formed in this case.

More specifically, FIG. 11 shows test results of a crystal structure as-deposit of the practical Au-Ge film which is 25 nm-thick, and also shows its dependency on composition. As is shown in FIG. 11, when the Ge content was 8 to 58 at.%, a micro-crystalline state of β-phase was obtained. Note that when the Ge content was 58 to 65 at.%, the micro-crystalline state of β-phase was obtained through an initial equilibrium process to be described later. By using a transmission type electron microscope to observe the recording layer formed of a 25 nm-thick Au-Ge alloy film, it was found that the crystal grain size was 20 to 50 nm or less.

From the above results, a composition having a Ge content from 8 to 65 at.% was found to be suitable.

<Changes in reflectivity upon changes in temperature>

Changes in the reflectivity of the recording layer, according to changes in the temperature of the layer, were examined by using an He-Ne laser (wavelength of 633 nm). More precisely, the recording layer was irradiated by a laser beam having a diameter of about 1 mm and power of 1 mW onto the surface of the recording layer, and the sample was heated, in an inert atmosphere, at a rate of 10° C./min, thereby enabling examination of the changes occurring in reflectivity, upon changes in the temperature of the recording layer. FIG. 12 shows the results of samples #2 to #7, in Table 1. A significant increase in reflectivity is found at about the eutectic temperature (356° C.) for each sample.

Example 2

(Enhancement effect of change in reflectivity caused by use of thin transparent dielectric film No. 1)

Following the same procedures as in Example 1, a recording layer was formed. Then, a thin silicon nitride film was stacked, thereby forming a recording medium having a structure as shown in FIG. 3. Using the same film-formation apparatus as in FIG. 9, the thin transparent dielectric film consisting of silicon nitride was formed by bias sputtering in which a sintered $Si_3N_4$ target and Ar gas containing 10% nitrogen were respectively used as target 14 and a sputtering gas, and high-frequency electric power was applied to holder 12.

The measurement results of spectral reflectivity and transmittance of samples #9 and #10 thus obtained are shown in FIGS. 13 to 16. Film thickness t of the silicon nitride film is plotted along the abscissa, and reflectivity R, transmittance T, and absorbency A evaluated by $(1-R-T)$ are plotted along the ordinate.

Figure 13:
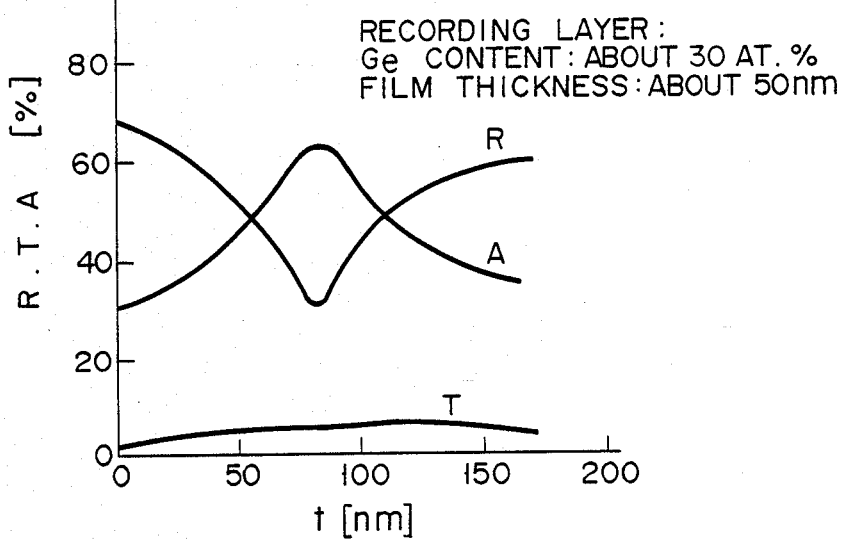
FIGS. 13 to 16 are graphs for explaining how spectral reflectivity, transmittance, and percent absorption of the recording medium according to the present invention, depend on the film thickness of a thin transparent dielectric film when compositions and film thicknesses of the recording layers differ from each other.
Figure 14:
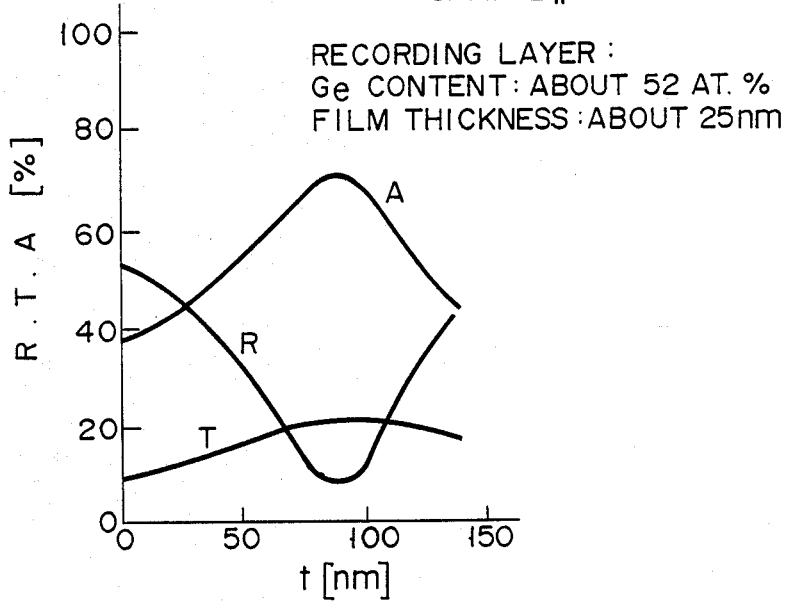

FIGS. 13 and 14 show the results when the laser beam wavelength was 633 nm. As is shown in FIGS. 13 and 14, in this case, absorbency A increases more than 1.5 times and reflectivity R decreases when t=50 to 120 nm. An absorbency A of about 1.5 times or more means that write-sensitivity is increased by more than 1.5 times.

Figure 15:
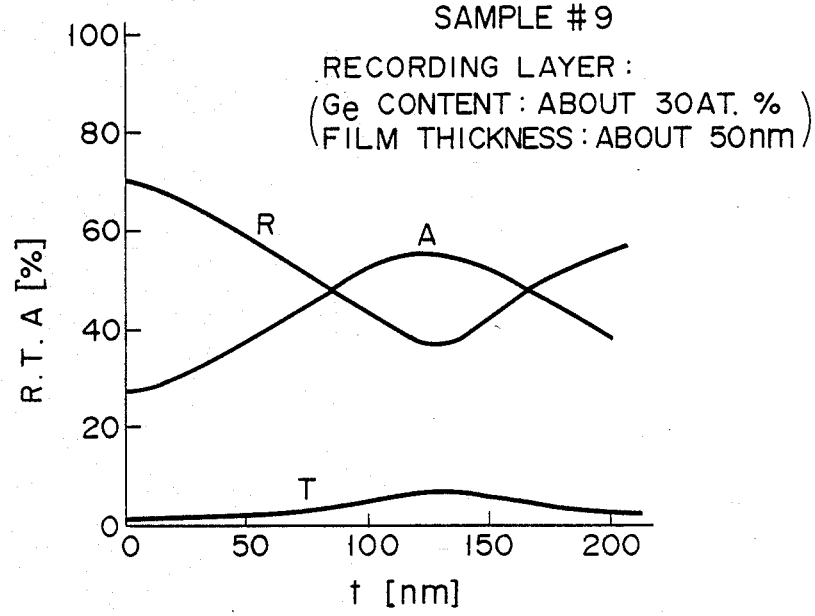
Figure 16:
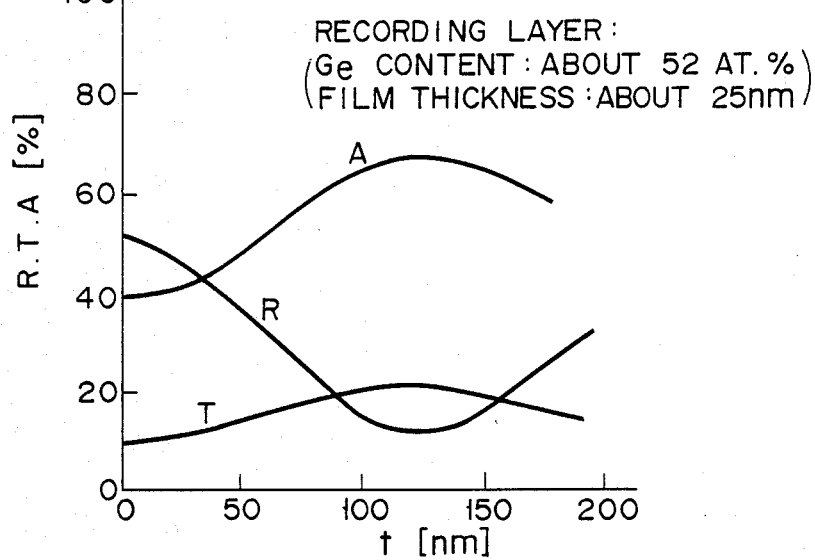

FIGS. 15 and 16 show the results when the laser beam wavelength was 830 nm. As is apparent from FIGS. 15 and 16, a conspicuous effect appears when t=80 to 170 nm. The same test was performed when the laser beam wavelengths were 750 and 800 nm, and substantially the same results as those in FIGS. 15 and 16 were obtained.

Following the same procedures as in Example 1, the changes in reflectivity, upon changes in temperature, of substantially the same samples #11 and #12 as those described above were examined when the laser beam wavelength was 633 nm. The results are shown in FIG. 17, in which the x-axis represents a sample temperature, and the y-axis represents relative changes (%) in reflectivity represented by $\Delta R/R$ when the reflectivity as-deposited is R and the change in reflectivity is $\Delta R$.

Figure 17:
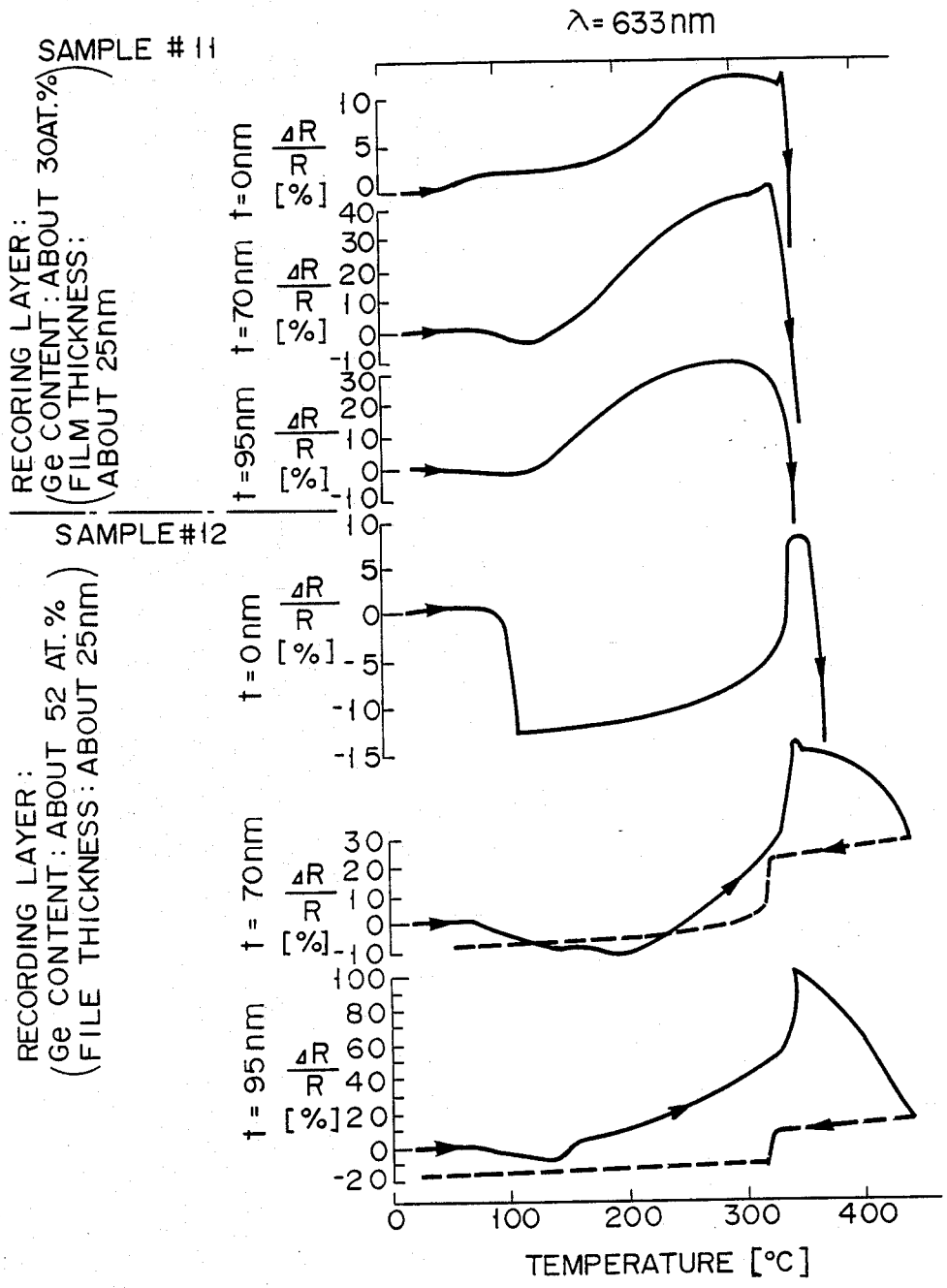
FIG. 17 is a graph showing changes in the reflectivity of the recording medium according to the present invention upon temperature changes, when the compositions and film thicknesses of the recording layers, and the film thicknesses of the thin transparent dielectric films differ from each other.

Film thicknesses t of thin silicon nitride films of samples #11 and #12 are shown in FIG. 17. In a structure wherein silicon nitride films are stacked to obtain t=50 to 120 nm, the reflectivity is decreased, but relative changes in reflectivity are increased 10 times. This means an increase in the S/N ratio of a read signal.

Example 3

(Enhancement effect of change in reflectivity caused by use of thin transparent dielectric film: No. 2)

In this Example, the recording medium having a structure as shown in FIG. 6, wherein the laser beam was irradiated onto the substrate surface, was formed, and its enhancement effect was examined. The recording layer and the film-formation method used to form the thin transparent dielectric film were the same as those of Example 2. Note that when a thin silicon nitride film was deposited on an organic resin substrate, bias electric power was not applied to the substrate, for the initial period of sputtering.

As a result of performing the same test as that in Example 2, it has been confirmed that the change in reflectivity is enhanced in the case where silicon nitride film thickness t'=50 to 120 nm, and where the laser beam wavelength is 633 nm, and also in the case where t'=80 to 170 nm, and where the laser beam wavelength is 830 nm.

Example 4

(Enhancement effect of change in reflectivity caused by use of thin transparent dielectric film: No. 3)

In this example, the enhancement effects of a recording media each having a multilayer structure, i.e., a recording medium with a three-layer structure as shown in FIGS. 4 and 7, and with a four-layer structure as shown in FIGS. 5 and 8, were examined. In order to manufacture these recording media, recording layer 2 and thin dielectric films 5, 6 were formed by using the same procedures as in the case of Examples 2 and 3. A thin aluminum film having a film thickness of 100 nm was also formed, as reflecting film 7, by use of the same procedures.

The same tests as used in Examples 2 and 3 were performed for the recording media, and it was confirmed that a change in reflectivity is further enhanced as compared with not only a one-layer structure but also a two-layer structure.

Example 5

(Film thickness-dependency of spectral reflectivity and transmittance characteristics of the recording layer)

Film thickness-dependency of spectral reflectivity and transmittance characteristics of the recording layer formed of a thin Au-Ge alloy film were measured. The measurement results are shown in FIGS. 18 and 19.

Figure 18:
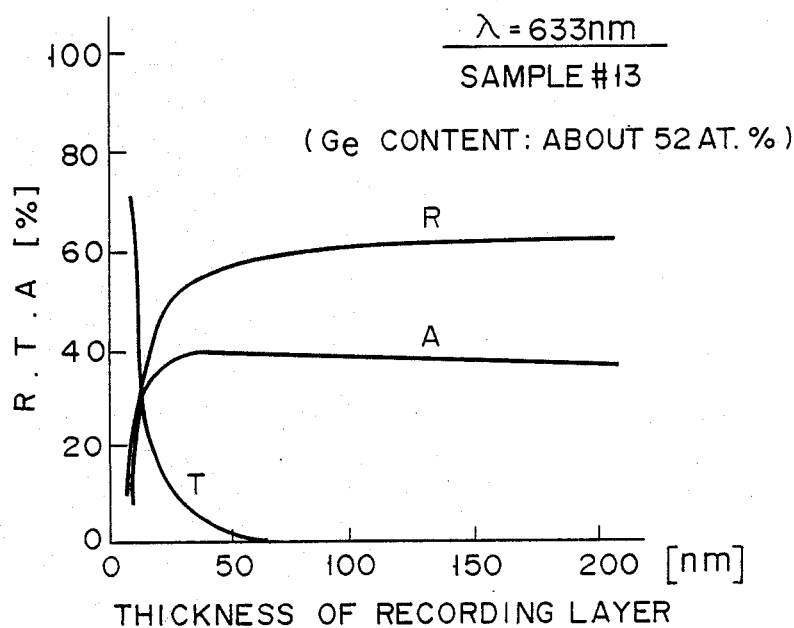
FIGS. 18 and 19 are graphs showing dependency of spectral reflectivity, transmittance, and percent absorption of the recording medium according to the present invention, upon recording layer film thickness when laser beam wavelengths differ from each other.
Figure 19:
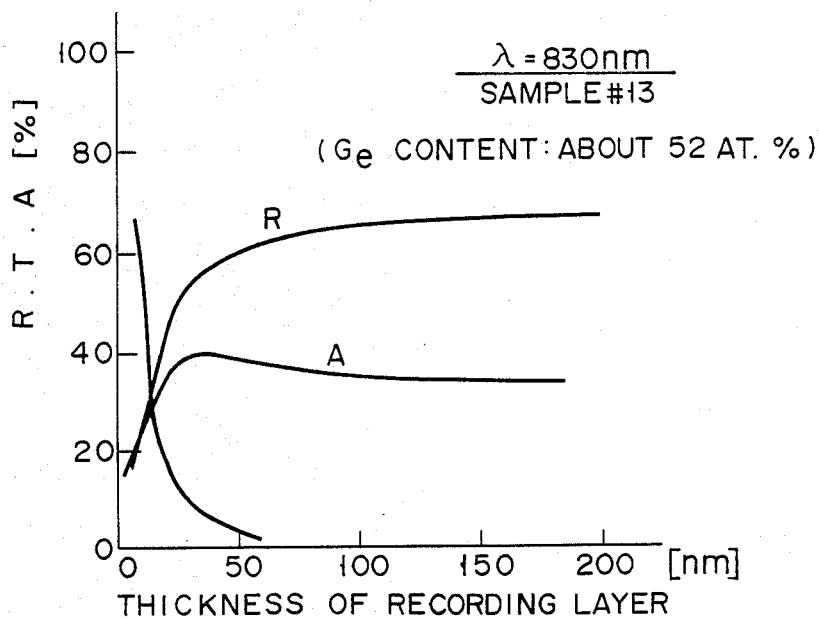

FIG. 18 illustrates the case in which the laser beam wavelength was 633 nm, and FIG. 19 exemplifies the case in which the laser beam wavelength was 830 nm. The x-axis in each graph represents the film thickness of the recording layer, and the y-axis represents reflectivity R, transmittance T, and absorbency A $(1-R-T)$ as in FIGS. 13 to 16. In either case, transmittance T increased rapidly and absorbency A decreased when the film thickness was less than 10 nm, thereby degrading the write-sensitivity of the recording medium. As a result, it was found that a suitable film thickness for the recording layer formed of a thin Au-Ge alloy film is 10 nm or more.

In the case of the three- and four-layer structures described in Example 4, the recording layer must be thin enough to allow the transmission of a suitable amount of light therethrough, as is described above with reference to FIGS. 4, 5, 7, and 8. From this viewpoint, a film thickness of 10 to 50 nm is suitable for the recording layer.

Example 6

(Write/read/erase test No. 1)

On the basis of the above test results, a write/read/erase test by means laser beam irradiation was performed. An He-Ne laser was used as a light source in this test. The laser beam was focused to a diameter of 1 $\mu$m and irradiated onto the film surface of the recording layer while scanning on the film surface at a linear speed of 1 to 2 m/sec, using a galvanomirror. Read-power was 0.4 mW on the film surface. The laser beam for writing had a pulse width of 300 nsec to 20 $\mu$sec and a power of 1 to 20 mW on the film surface.

<Writing and reading>

The recording layer sample having a film thickness of 200 nm and any of the compositions described in Example 1 could perform the write operation in a high-power region, but its sensitivity was not so high. On the other hand, when the film thickness of the recording layer was 50 nm or less, the threshold power required for writing was reduced. This is because the absorption energy per unit volume is decreased and heat conducted rapidlly into film when the recording layer is thick. Therefore, the film thickness of the recording layer is desirably 50 nm or less when practical write-power is taken into consideration. In particular, when a thin Au-Ge alloy film containing 8 to 65 at.% of GE was used as the recording layer, high sensitivity was obtained and the reflectivity of the written portion was high.

The recording medium having a structure obtained by stacking thin transparent dielectric films as described in example 2 could perform the write-operation with higher sensitivity. An example of this recording medium and its operation is as follows:

A thin Au-Ge alloy film containing 50% of Ge was formed to a thickness of 25 nm on a quartz substrate, and a thin silicon nitride film was deposited thereon to a thickness of 95 nm, to form a sample. The sample was irradiated by a laser beam onto the above stacked film. When the pulse width was set to 2$\mu$ sec and the power of 3 to 6 mW was applied, the reflectivity of the written portion of the recording layer increased as compared with those of other portions, so that the write operation was performed. When the radiation power was set to 6 mW, the write operation was performed with a pulse width of 300 nsec to 20 $\mu$sec.

As a result of performing the read operation by laser beam radiation, after the performing of the above write operation, the change in reflectivity was enhanced by 5 times or more as compared with a one-layer recording layer.

Based on the above results, improvements in both the write-sensitivity and the S/N ratio of read output described in Example 2 were confirmed. In addition, as a result of observing these written portions through an optical microscope having a magnification factor of 2,000, and through a scanning electron microscope having a magnification factor of 4,000, it was found that no change in shape occurs, nor are there any changes in reflectivity while the surface is kept flat.

<Erasing and rewriting>

The part of film surface of the written portion of the recording layer was focused upon and irradiated by a laser beam having power of 2.5 mW, while simultaneously being linearly scanned. As a result, the reflectivity of the written portion was decreased and returned to its original reflectivity, and the written information was erased.

Furthermore, the portion thus written and erased was irradiated by the laser beam under the same conditions as during the write operation, the reflectivity of the irradiated portion was again increased, again and the complete write operation was performed. These write and erase operations were able to be carried out repeatedly; thus, rewritablility was confirmed.

Example 7

(Write/read/erase test No. 2)

A write/read/erase test similar to that of Example 6 was performed using the recording medium obtained by depositing a 50-nm thick Au-Ge alloy film containing 30 at.% of GE on a quartz substrate, and by depositing a thin silicon nitride film to 70 nm thereon. As a result, the write operation by use of a laser beam having a pulse width of 4 $\mu$sec and power of 6.8 mW, and the erase operation by means of the linear radiation of a laser beam having power of 4 mw were capable of being performed repeatedly. Other conditions were the same as in Example 6.

In the above Example, the erase operation was performed by use of a focused linear laser beam; however, a pulse-like laser beam having a larger beam size and a larger pulse width than that used for the write operation can be used to perform the erase operation. In addition, the erase operation can be performed by annealing.

In the above Example, the description has been made with reference to a recording medium using quartz as a substrate. However, a similar test was performed using a PMMA (polymethylmethacrylate) substrate as an organic resin substrate, to enable the write operation to be performed with higher sensitivity.

The above write/read/erase test was performed using a recording medium having the same structure as that of FIG. 3,. Alternatively, though, the write/read/erase operation can be performed, under the same conditions, using the recording medium having the same structure as that of FIG. 6. When the three-layer structure shown in FIGS. 4 and 7, and the four-layer structure shown in FIGS. 5 and 8 were used, a higher sensitivity and a higher S/N ratio were be obtained.

Example 8

(Composition dependency of rewritable power)

Composition dependency of rewritable power was measured by varying the laser power used to perform write operations on Au-Ge recording layers having various compositions. As a sample, a recording medium was prepared by stacking an Au-Ge alloy layer of 25 nm thickness on a quartz substrate, and placing a silicon nitride protecting layer of 75 to 90 nm thickness thereon. An He-Ne laser (wavelength of 633 nm) was used as a light source to perform the write-operation with 4 $\mu$sec-pulses while sumultaneously being scanned at 0.6 m/sec. The test result is shown in FIG. 20.

Figure 20:
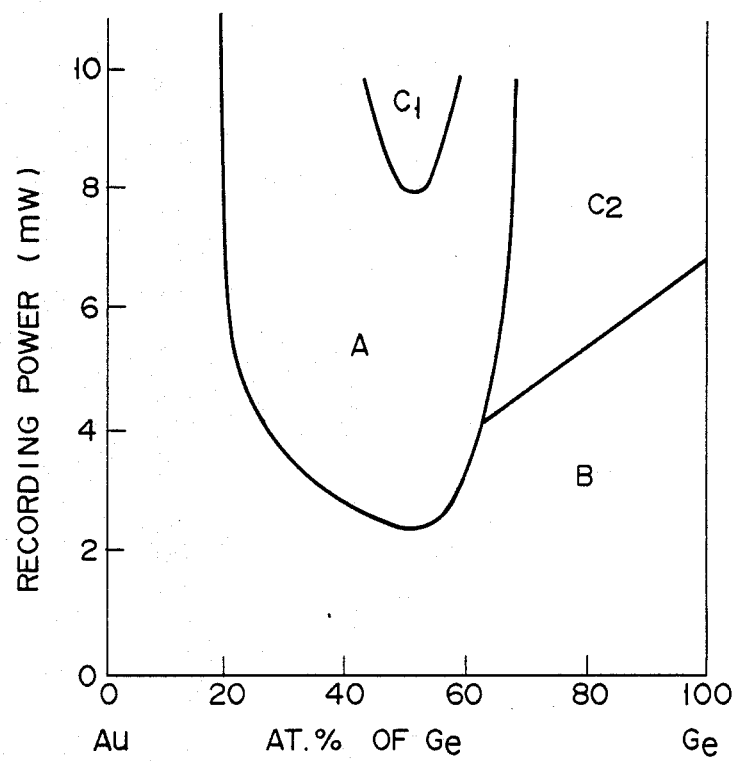
FIG. 20 is a graph showing a rewritable write-power condition of the recording medium according to the present invention.

In FIG. 20, reference symbol A denotes a rewritable region, B denotes an unwritable region, and $C_1$ and $C_2$ denote, unerasable regions. As is shown in FIG. 20, high sensitivity can be obtained when the composition range of the recording layer is around 40 to 60 at.% of Ge. At about 50 at.% of Ge, being the most sensitive composition, and using a write-pulse-width of 4 μsec, the recording layer was rewritable with a write-power of 2.5 to 7.5 W. At this time, the relative reflectivity difference between the written and erased portions was typically about 30%.

When the pulse width was shortened, the rewritable range of the write-power was shifted to the high-power side. For example, typical rewritable power was 9 mW at about a 300 nsec pulse. At this time, the relative change in reflectivity between the written and nonwritten portions was about 30% as in the above case. In other words, the write-energy was about 3 nJ per bit, and about 2 nJ thereof was absorbed in the recording layer.

Note that the test results were obtained using quartz as the substrate; however in the interest of cost, use of an organic resin substrate is considered preferable. The organic resin substrate also has lower heat conduction factor than the quartz substrate, so that the write-power is reduced by about 40 to 60%. Therefore, in the most sensitive sample having 50 at.% of Ge, used in the above test, when the substrate was replaced by an organic resin substrate, write-power of about 300 μsec pulse and 3.6 to 5.4 mW was found to be suitable for the erasable write operation.

In the same test, laser beams of various powers were linearly scanned to perform the erase operation, and the relationship between the write-power of pulse radiation and the erase-power of linear radiation was examined. As a result, when the write operation was performed with 4 μsec pulse, the suitable erase-power was 30 to 70% of the write-power. When the write-operation was performed with 300 nsec, the suitable erase-power was 20 to 50% of the write-power.

Example 9

(Write/read/erase test No. 3)

This write/read/erase test was performed using a semiconductor laser having a wavelength of 830 nm to allow the write/read operation to be performed with a high sensitivity and a high S/N ratio, as in Example 6 and 7. In this case, with the structures of FIGS. 3, 5, 6, and 8, a suitable film thickness t' of thin transparent dielectric film 5 was t'=80 to 170 nm.

More specifically, a recording medium having the structure obtained by stacking a thin silicon nitride film on a PMMA substrate, to 135 nm, a recording layer formed of a thin Au-Ge alloy film thereon, to 25 nm, and a thin silicon nitride film as a thin transparent dielectric film thereon, to 200 nm was irradiated by the laser beam onto the substrate surface, while being rotated at 300 rpm to enable performing of the write/-read/erase operation. In addition, semiconductor lasers having wavelengths of 750, 780, and 800 nm were used as light sources, in order to obtain the same results.

Example 10

(Unerasable write operation)

When the write operation was performed using a laser beam having higher power than those of Examples 6 and 7, the written portion was sometimes unerasable. For example, using the recording medium (used in Example 6) obtained by depositing a recording layer of a thin Au-Ge alloy film on a quartz substrate, to 25 nm, and a thin silicon nitride film thereon, to 95 nm, the following result was obtained:

When this sample was irradiated by a laser beam onto the film surface of the recording layer, information written by one linear radiation cycle, using power of 8 mW, was not able to be erased. Additionally, information written by use of power of 10 mW and a pulse width of 4 μsec could not be erased either.

As a result of observing the above unerasable written portions, through an optical microscope having a magnification factor of 2,000, the portions were expanded. When the written portions were observed through a scanning electron microscope having a magnification factor of 10,000, although holes were not completely formed, continuity of the film of the recording layer was lost, the surface texture appearing melted and coaqulated. This is because the recording layer was completely melted by the heat of the laser beam during the write operation. Therefore, in order to obtain an erasable written state, the laser beam power during the write operation must be limited to within the range whereby such a phenomenon can be prevented.

Figure 21:
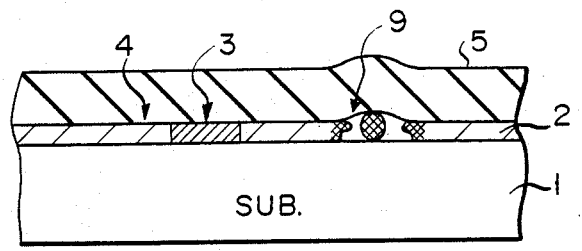
FIG. 21 is a sectional view of the recording medium of the present invention, when a partially unerasable write operation is performed.

FIG. 21 shows the state of the recording medium on which the above unerasable write operation was partially performed. As is shown in FIG. 21, normally erasable written portion 3 and nonwritten or erased portion 4 maintains a flat state, while unerasable written portion 9 projects above the mean surface level.

The unerasable write operation as described above is not desired for an erasable recording medium, but it may, however be utilized in a positive way. More specifically, the above unerasable write operation can be performed to write any information which a user does not want to erase, so as to permanently preserve it on the recording medium.

The power of the laser beam during the unerasable write operation is generally 1.2 to 1.9 times that used during the erasable write operation. This power is within a practical range which can be realized without difficulty, when using an existing semiconductor laser, an He-Ne laser, or the like. In the unerasable write-portion as described above, the reflectivity was increased to the same level as that in the normally erasable write portion, thereby enabling performing of the read operation in the same manner as for the normally erasable write-portion.

Example 11

(Texture analysis of written and erased portions)

After the write/read/erase test described in Example 6, the written and erased portions were observed through a transmission-type electron microscope.

It was observed by electron deffraction analysis that the recording layer as-deposit of the recording medium used in Example 6 had a micro-crystal of $\beta$-phase as a metastable state. On the other hand, when the written portion was analyzed by an electron microscope and electron diffraction, it was confirmed that the portion was a $\gamma$-phase as a metastable state obtained by a liquid quenching method using a thin Au-Ge alloy film, and had a comparatively large crystal grain size of about 0.5 μm. When the erased portion was similarly analyzed, it was found that the portion had a micro-crystal (grain size of 50 nm or less) in a mixed phase state of $\beta$-phase + Ge + α-phase closer to the equilibrium state than was the written portion.

From the above results, it was found that the write/erase process according to the present invention depends on the transition between the crystalline states having different structures as described above.

Example 12

(Changes in write-characteristics upon composition changes in the recording layer)

Figure 22:
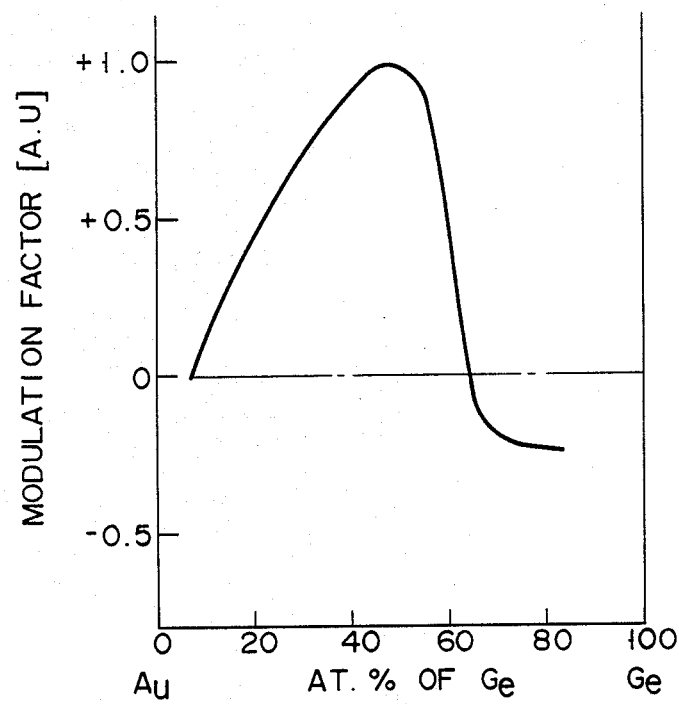
FIG. 22 is a graph showing changes in the recording characteristics of the recording medium, with respect to changes in the composition of the recording layer.

Changes in recording characteristics were examined when the composition of the recording layer formed of a thin Au-Ge alloy film was changed. FIG. 22 shows an example of the result of the test. A sample used in the test was a recording medium obtained by stacking a recording layer formed of a thin Au-Ge alloy film on a quartz substrate, to 25 nm, and forming thereon a thin transparent dielectric film of a thin silicon nitride film, to 75 nm. The recording layer was irradiated by a pulse-like laser beam, having a power a of 6 mW and a pulse width of 16 μsec, onto the film surface using an He-Ne laser (wavelength of 633 nm) as a laser source to perform the write operation.

In FIG. 22, the y-axis represents a normalized modulation factor of a read output taking 1 for a maximum value. A positive value in the y-axis represents a case wherein the reflectivity of the written portion is increased, and the x-axis represents the Ge content (at.%).

As is apparent from the result shown in FIG. 22, the reflectivity is increased thereby facilitating the write operation when the content of Ge is 8-65 at.%. Further, in, these written portions it was able to perform the erase/rewrite-operation. Note that within this composition range, the composition having 25 to 60 at.% of Ge has high write-sensitivity and a high S/N ratio for the read output, and hence is especially preferable.

Example 13

(Initial equilibrium of recording layer: No. 1)

The following examples describe cases wherein an initial equilibrium process was performed by annealing after formation of the film the recording layer.

A suitable annealing temperature for the initial equilibrium process is, as described above, a temperature less than a given eutectic temperature of two main elements constituting the recording layer. In performing the annealing process, the glass transition point of a substrate material used for the recording medium must be taken into consideration. This is because a substrate material used for this type of optical recording medium, e.g., organic resin such as PMMA, PC (polycarbonate), epoxy, or glass, deforms when heated to a temperature higher than its glass transition temperature. Table 2 shows the glass transition points of these substrate materials.

TABLE 2

| Substrate Material | PMMA | PC | Epoxy | Glass |
|---|---|---|---|---|
| Glass Transition Point | 98 (°C.) | 150 (°C.) | 125 (°C.) | 530 (°C.) |

In this Example, a recording layer formed of a thin Au-Ge alloy film was deposited to 25 nm on a quartz substrate, and a thin silicon nitride film was deposited thereon, to 95 nm, to obtain a recording medium (the recording medium described in Example 6). After the formation of film on the recording layer, the resultant structure was annealed in an electric furnace at 150° C., for 20 sec. The recording medium was subjected to the same write/read/erase test as that in Example 6, and was able to perform the write/read/erase operation under the same conditions as the case before annealing. In addition, the recording medium, following the annealing, has a smaller difference between the reflectivities of the nonwritten and erased portions, and also and a lower noise level than the recording medium having the recording layer as-deposited.

Example 14

(Initial equilibrium of recording layer: No. 2)

A thin Au-Ge alloy film having 30 at.% of Ge was deposited to 50 nm on a quartz substrate, and thin silicon nitride film was deposited thereon to 70 nm, to form a recording medium (the recording medium described in Example 7). After the formation of film on the recording layer, the resultant structure was annealed at 150° C., for 20 sec, as in Example 13, to enable the performing of the initial equilibrium process. Thereafter, when the resultant structure was subjected to the write/read/erase test, the difference between the reflectivities of the nonwritten and erased portions was also small, following the annealing.

The same recording medium was annealed at 300° C., for 10 min, and then subjected to the write/read/erase test under the same conditions. In this case, changes in the reflectivity of the nonrecorded portion were also found, but the S/N ratio was decreased, as compared with that of the recording medium as-deposited. When analyzed by X-ray diffraction, the recording layer, following the above-mentioned annealing, was found to be in the erase-state of a α-phase + Ge. However, as a result of analysis by means of an optical microscope and the scanning electron microscope, the crystal grain size was found to have increased. In other words, the S/N ratio was degraded because the surface of the recording layer was roughened thereby causing a grain boundary noise to be generated. Therefore, when conducting the initial equilibrium process for the recording layer, the proper annealing temperature and length of time must be carefully selected.

Example 15

(Initial equilibrium of recording layer: No. 3)

<Initial equilibrium process for recording medium whose substrate consists of organic resin>

In this Example, the recording medium using a PMMA substrate was subjected to the initial equilibrium process. When the sample was annealed at 150° C., the substrate deformed, and guide grooves performed on the substrate collapsed. This is because the PMMA substrate was heated to a temperature exceeding its glass transition point (98° C.), shown in Table 2. Therefore, as annealing was performed for the initial equilibrium process when the organic resin substrate with a comparatively low glass transition point was used, a method of increasing the temperature of the recording layer, but without raising the substrate temperature should preferably be used. An example of such a method for this purpose is annealing by laser beam irradiation. This method will now be described below.

<Initial equilibrium process by use of a laser beam>

Figure 23:
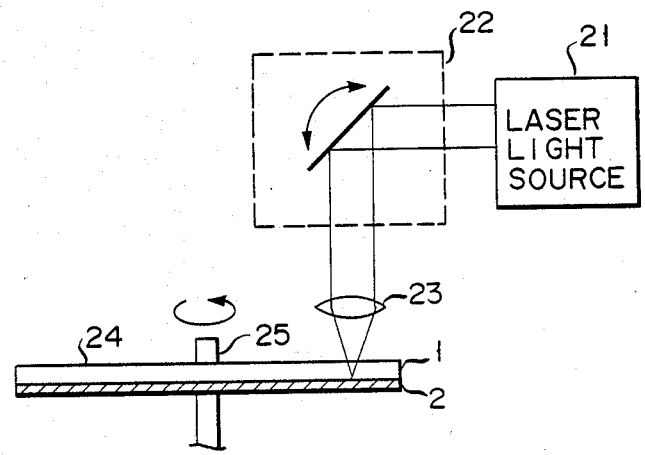
FIG. 23 is a view of an example of an apparatus used for putting the recording layer into an equilibrium state.

FIG. 23 shows an example of an annealing apparatus (initial equilibrium process apparatus) using a laser beam. In FIG. 23, reference numeral 21 denotes a laser beam source. An Ar ion laser, an He-Ne laser, a semiconductor laser, or the like can be used as source 21. A beam from source 21 is focused and irradiated, through optical system 22 and objective lens 23, onto recording layer 2 on substrate 1 of recording medium 24 which is rotating about shaft 25. System 22 includes a mechanism for moving and scanning the laser beam radially, with respect to medium 24 (optical disc).

Using the above apparatus, medium 24 is rotated and continuously irradiated by the scanning laser beam, thereby heating the entire layer 2 on the substrate 1, to enable the performing of the initial equilibrium process. In this case, the material forming substrate 1 is transparent with respect to the laser beam wavelength and does not absorb its energy. According to this method, since only layer 2 can be heated by the laser beam focused thereonto, and the heat generated in layer 2 is dissipated therethrough, due to layer 2 having a heat conduction factor greater than that of substrate 1, no substantial temperature rise occurs in substrate 1. Therefore, such a problem as thermal deformation of substrate 1 can be eliminated. Note that the laser beam may be irradiated not only from substrate 1 but from recording layer 2.

The object of above-described annealing, by means laser beam radiation, is the performing of the initial equilibrium process. Thus, the temperature of the recording layer is raised to a suitable temperature lower than the eutectic temperature and is then allowed to cool gradually, with the result that the recording layer is in the mixed phase state closer to the equilibrium state, i.e., the same state as the erased state. Therefore, laser power capable of heating the recording layer to a temperature lower than the eutectic temperature must be used. In addition, when the recording layer is heated to such a temperature and then cools rapidly, the above initial equilibrium state may not be attained. Therefore, the linear speed of the laser beam (the rotational speed of the recording medium) should preferably be low enough to avoid rapid cooling taking place. Rapid cooling in this case means that the rate of cooling is $10^{10°}$ C./sec or more. In order to obtain a gradual cooling effect the focus of the laser beam may be diverted slightly away from the recording layer.

The initial equilibrium process facilitated by use of the laser beam has the following advantages in addition to the fact that the organic resin substrate is not thermally deformed.

In an optical recording medium, a guide groove for guiding an optical head is formed on the substrate. However, if the initial equilibrium process is performed by annealing using the laser beam as described above, the portion subjected to the initial equilibrium process may be used instead of the guide groove. That is, the recording layer is formed using a flat substrate without a groove and then scanned with the laser beam in a spiral or concentric circles manner to perform the initial equilibrium process so as to leave some portions as-deposited. When the initial equilibrium process is performed in this manner, a difference occurs between reflectivities of the portion as-deposited and the portion subjected to the initial equilibrium process. Therefore, the difference between reflectivities is detected during the write-or-read operation, and a position of an optical head along a radial direction of the recording medium is controlled accordingly, thereby performing tracking.

An example of the above initial equilibrium process by the laser beam will now be described.

In FIG. 23, recording medium 24 was obtained by sequentially stacking a thin silicon nitride film having a film thickness of 85 nm as a thin transparent dielectric film on a PMMA substrate, a recording layer formed of a thin Au-GE alloy film and having a film thickness of 25 nm thereon, and a thin silicon nitride film having a film thickness of 100 nm as a thin dielectric film also serving as a protecting layer thereon, using the magnetron sputtering method. Medium 24 was set to shaft 25 as shown in FIG. 23, rotated thereabout, and then irradiated with the laser beam. At this time, a linear speed of laser beam scanning was set to 0.5 m/sec. In addition, the laser beam was not completely focused onto layer 2, not focused to the diffraction limit, and continuously radiated with power of 5 mW on the surface of medium 24. When medium 24 was examined after the initial equilibrium process, no deformation or collapse of the guide groove of substrate 1 was found.

The same write/read/erase test as those in Examples described above was performed for the recording medium thus subjected to the initial equilibrium process, and the result was compared with the case without the initial equilibrium process. As a result, as for the read output in the presence of a rewritten portion, the recording medium subjected to the initial equilibrium process had a higher S/N ratio. This is because, as described in Example 13, the difference between reflectivities of the nonrecorded and erased portions is small when the initial equilibrium process is performed, thereby reducing the noise.

Note that when the recording layer was removed and subjected to the electron diffraction test, it is confirmed that the portion subjected to the initial equilibrium process by the laser beam was $\beta$-phase + Ge + $\alpha$-phase, and the portion erased after information was once written was also $\beta$-phase + Ge + $\alpha$-phase.

In the above example of the initial equilibrium process by laser beam irradiation, the laser beam may be radiated from the substrate or from the film. Note that when the recording medium having a structure obtained by stacking a thin transparent dielectric films is used to increase utilizing efficiency of the laser beam energy, the laser beam for the initial equilibrium process is preferably radiated in the same direction as that during the write/read/erase-operation because only smaller laser power is required. Note that either of a semiconductor laser or having wavelengths of 830, 800, 780 nm an Ar ion laser can be used as a laser beam source for the initial equilibrium process to obtain the same result.

Example 16

(Initial equilibrium process of recording layer: No. 4)

In the initial equilibrium process by the laser beam in Example 15, only a single recording medium can be processed at the same time by a single initial equilibrium process apparatus as shown in FIG. 23. For this reason, when the recording medium is to be mass-produced, a number of the same initial equilibrium process apparatuses must be prepared. On the contrary, a number of recording mediums can be simultaneously processed by a single initial equilibrium process apparatus if the following method is used.

More specifically, as a result of close examination regarding the recording layer of the thin Au-Ge alloy film by the present inventors, it is found that the initial equilibrium process is possible at a temperature lower enough than a glass transition point of a practical organic resin substrate such as a PMMA substrate. For this reason, the recording medium after film formation of the recording layer is put into a thermostatic oven which maintains a temperature lower than a glass transition point of the substrate, thereby performing the initial equilibrium process. According to this method, a number of recording mediums can be put into a single thermostatic oven at once to simultaneously perform the initial equilibrium process.

In this case, a temperature of the thermostatic oven must be not lower than a critical temperature required for the recording layer to transform from a metastable crystal state as-deposited to the mixed-phase closer to the equilibrium state. For example, when the recording layer is a thin Au-Ge alloy film, it is found that its critical temperature is about 50° C.

With this method, the recording medium could be annealed at a temperature which a practical organic resin substrate sufficiently withstands without problems such as deformation, thereby achieving the initial equilibrium process.

For example, when a thin Au-Ge alloy film is used, as shown in Table 1, it crystal structure is a monophase of β-phase or γ-phase in as-deposited film and is a mixed phase of β-phase + Ge or α-phase + Ge in an erase state, so that a rate controling factor during the initial equilibrium process is diffusion. Therefore, in the initial equilibrium process of the recording layer according to the present invention, diffusion of constituting elements is an important factor, so that the annealing for the initial equilibrium process must be performed for a time long enough to allow the constituting elements to sufficiently diffuse at a temperature of the thermostatic oven which satisfied the above conditions. The time for sufficient diffusion means a time required for the constituting elements to diffuse to an extent of the order of the film thickness of the recording layer. However, if the time is too long, a crystal grain of the recording layer is enlarged and a grain boundary noise may be undesirably generated. This applies to the case wherein the recording layer has another composition.

An example of the initial equilibrium process using a thermostatic oven will be described below.

The recording medium described in Example 15 was put into a thermostatic oven having a temperature of 65° C. with its recording layer as-deposited and was maintained for 10 hours to perform the initial equilibrium process. The thermostatic oven was a conventional one and had a volume of about 1 m³. A number of recording mediums (e.g., 150 optical discs of 300 mm diameter) can be housed in the thermostatic oven.

The recording medium was examined after the initial equilibrium process, and no deformation nor collapse of the substrate was found. When the write/read/erase-test was performed for the recording mediums, with and without the initial equilibrium process, the one with the initial equilibrium process has a higher S/N ratio of read output if a rewritten portion was present.

Example 17

(Initial equilibrium process: No. 5)

The recording medium similar to that in Example 15 was put into an thermostatic oven having a temperature of 50° C. with its recording layer as-deposit and maintained for 10 hours. However, as a result of the X-ray diffraction or the write/read/erase-test, no initial equilibrium was achieved. This is because the maintaining time in the thermostatic oven is short as compared with that required for the initial equilibrium at the above process temperature.

Examples of the present invention have been described above including the example of the process of manufacturing the recording medium and the method of the initial equilibrium process. However, the present invention can be modified and carried out without departing from the scope of the invention.

For example, as the recording layer of the recording medium used in the present invention, a thin Au-Ge alloy film, especially a thin film having a Ge content of 8 to 65 at.% is exemplified. However, a recording layer need only contain a transition element of Group I and a representative element of Group IV as two main elements, so that a thin Au-Si alloy film, a thin Ag-Ge alloy film, and the like in addition to the thin Au-Ge alloy film may be used.

Among these elements, a combination of a transition element of group I and a representative element of Group IV having a eutectic temperature within a range of 150 to 700° C. is especially suitable. That is, if possibility of transition of the written state (metastable state) to the erased state (state close to the equilibrium) around room temperature or possibility wherein the written information is erased by read laser beam irradiation is taken into consideration, the lower limit of the eutectic temperature is desirably 150° C. The reason why the upper limit of the eutectic temperature is desirably 700° C. is that the recording layer of the present invention must be heated around the eutectic temperature during the write operation and it is difficult to heat it to a temperature higher than 700° C. considering practical laser power. In addition, when the present invention is actually put into a practical use, the transition element of Group I and the typical element of Group IV having the eutectic temperature within the range of 250 to 450° C. are preferred. Table 3 shows eutectic temperatures between the transition element of Group I and the typical element of Group IV (except carbon C).

TABLE 3

| | Group Ib | | |
| Group IVa | Cu | Ag | Au |
| --- | --- | --- | --- |
| Si | 802° C. | 830° C. | 370° C. |
| Ge | 640° C. | 651° C. | 356° C. |
| Sn | 227° C. | 221° C. | 217° C. |
| | | | 280° C. |
| Pb | 954° C. | 304° C. | 215° C. |
| | 326° C. | | |

As a recording layer of a recording medium in the present invention, thin alloy films of all combinations of the transition elements Cu, Ag, and Au of Group $I_b$ and the representative elements Si, Ge, Sn, and Pb of Group $IV_a$ shown in table 3 other than the thin Au-Ge alloy films may be used.

In addition, a thin film having Al and the representative element of Group IV as two main elements, e.g., a thin Al-Ge alloy film (eutectic temperature of 424° C.) and a thin Al-Si alloy film (eutectic temperature of 577° C.) may be used.

Furthermore, in order to further improve the write- or rewrite-characteristic, an S/N ratio or read output, life, or the like, an additional element other than the transition element of Group I and the representative element of Group IV may be added to the recording layer as needed.

Based on the above description, the effects of the present invention are summarized as follows:

(1) Rewritability. In addition, a nonerasable write-operation can be performed within practical laser beam power, if required;

(2) Elements constituting the recording layer of the recording medium have no toxicity, superior in resistance to corrosion and environment, and have a long storage life;

(3) A wide composition margin of the recording layer. In addition, superior reproducibility and mass-productivity can be obtained by using the sputtering method for film formation;

(4) High write-sensitivity and high S/N ratio of read output;

(5) A time required for the write- or erase-operation is short because reflectivities are greatly different between the written and erased portions of the recording layer while the two portions commonly have a dense stacking structure as a crystal structure;

(6) An initial crystallization process is not required, and an initial equilibrium process may be omitted;

(7) An S/N ratio of read output can be further improved by performing the initial equilibrium process as needed.

What is claimed is:

1. A rewritable information recording medium comprising a recording layer containing, as two principal elements, a Group I transition element selected from the group consisting of Cu, Ag and Au and Group IV representative element selected from the group consisting of Si, Ge, Sn and Pb, and a support substrate for physically supporting said recording layer, wherein said recording layer is reversibly convertible between a written state and an erased state and has the following characteristics:

(a) first and second metastable phases having different energy levels can be formed in said recording layer by heating and immediately cooling the recording layer;
  (b) the written state in the first metastable phase of the higher energy level has a higher reflectivity than that of the erased state in the second metastable phase of the lower energy level;
  (c) the written state in the first metastable phase is obtained by heating the recording layer in another state by light beam irradiation; and
  (d) upon being cooled after it is heated to a temperature lower than that for obtaining the first metastable phase, a portion in the written state is converted to the erased state.

2. A medium according to claim 1, wherein the written state has a larger crystal grain size than that in the erased state.

3. A medium according to claim 1, wherein the two principal elements constituting said recording layer are a combination of the Group I transition element and the Group IV representative element of the Periodic Table having the eutectic temperature within the range of 150° C. to 700° C.

4. A medium according to claim 3, wherein in the two principal elements constituting said recording layer, the Group I transition element of the Periodic Table is Au, and the Group IV representative element is Ge.

5. A medium according to claim 4, wherein a Ge content in said recording layer is 8 to 65 atomic percent.

6. A medium according to claim 4, wherein a silicon nitride film having a film thickness of 50 nm to 170 nm is stacked as a thin transparent dielectric film on a surface of said recording layer opposite to said support substrate.

7. A medium according to claim 4, wherein said recording layer is formed by a sputtering method.

8. A medium according to claim 4, wherein a silicon nitride film having a film thickness of 50 to 170 nm and a light reflecting film are sequentially stacked on a surface of said recording layer on the side of said support substrate or on a surface thereof opposite to said support substrate, and the film thickness of said recording layer is 10 nm to 50 nm.

9. A medium according to claim 1, wherein said recording layer was subjected to a thermal treatment at a temperature below a melting point after film formation.

10. A medium according to claim 1, wherein a thin transparent dielectric film is stacked on a surface of said recording layer opposite to said support substrate.

11. A medium according to claim 1, wherein a thin transparent dielectric film and a light reflecting film are sequentially stacked on a surface of said recording layer opposite to said support substrate.

12. A medium according to claim 1, wherein a thin transparent dielectric film is formed also on the surface of said recording layer on the side of said support substrate.

13. A medium according to claim 1, wherein a thin transparent dielectric film is stacked on a surface of said recording layer on the side of said support substrate.

14. A medium according to claim 1, wherein a thin transparent dielectric film and a light reflecting film are sequentially stacked on a surface of said recording layer on the side of said support substrate.

15. A medium according to claim 14, wherein a thin transparent dielectric film is formed also on the surface of said recording layer opposite to said support substrate.

16. A method of writing, reading and erasing information in which a recording medium which has a recording layer containing, as two principal elements, a Group I transition element selected from the group consisting of Cu, Ag and Au and a Group IV representative element selected from the group consisting of Si, Ge, Sn and Pb, and a support substrate for physically supporting said recording layer is used, comprising the steps of:

(a) in a write-mode, locally heating an arbitrary area of said recording layer up to the temperature equal to or higher than a eutectic temperature of the two principal elements by light beam irradiation, and immediately cooling said recording layer so as to selectively convert only the irradiated portion to a written state in a first metastable phase having a higher reflectivity than that of an erased state in a second metastable phase of energy level lower than that of the first metastable phase, thus allowing information to be written;
  (b) in an erase-mode, cooling a portion in the written state after heating it to a temperature lower than that in the write-mode, so as to convert the portion to the erased state; and (c) in a read-mode, radiating a light beam of power lower than that of the erasing beam onto said recording layer and detecting that a reflected light intensity from an area of the written state is greater than that from other portions of the erased state, thus allowing written information to be read.

17. A method according to claim 21, wherein the erased state is $\beta$-phase + Ge.

18. A method according to claim 16, wherein the two principal elements constituting said recording layer are a combination of the Group I transition element and the Group IV typical element of the Periodic Table having the eutectic temperature within the range of 150° C. to 700° C.

19. A method according to claim 16, wherein in the two principal elements constituting said recording layer, the Group I transition element of the Periodic Table is Au, and the Group IV representative element is GE.

20. A method according to claim 19, wherein a Ge content in said recording layer is 8 to 65 atomic percent.

21. A method according to claim 19, wherein the first metastable phase of the high reflectivity is a $\gamma$ phase, and the second metastable phase of lower energy level than that of the first metastable phase is a $\beta$ phase.

22. A method according to claim 21, wherein a state of the low reflectivity is a $\beta$ phase + Ge or an $\alpha$ phase + Ge.

23. A method according to claim 27, wherein said recording layer is subjected to the thermal treatment at a temperature below a melting temperature prior to a write operation after film formation of said recording layer.

24. A method according to claim 16, wherein a light beam is radiated from the side of said recording layer.

25. A method according to claim 16, wherein a light beam is radiated from the side of said support substrate.

26. A rewritable information recording medium comprising a recording layer containing, as two principal elements, a Group I transition element selected from the group consisting of Cu, Ag and Au and a Group IV representative element selected from the group consisting of Si, Ge, Sn and Pb, and a support substrate for physically supporting said recording layer, wherein said recording layer and is reversibly convertible between a written state and an erased state and has the following characteristics:
(a) first and second metastable phases having different energy levels can be formed in said recording layer by heating and immediately cooling the recording layer;
(b) the written state in the first metastable phase of the higher energy level has a higher reflectivity than that of the erased state in an equilibrium phase;
(c) the written state in the first metastable phase is obtained by heating the recording layer in another state by light beam irradiation; and
(d) upon being cooled after it is heated to a temperature lower than that for obtaining the first metastable phase, a portion in the written state is converted to the erased state.

27. A method of writing, reading and erasing information in which a recording medium which has a recording layer containing, as two principal elements, a Group I transition element selected from the group consistent of Cu, Ag and Au and a Group IV representative element selected from the group consisting of Si, Ge, Sn and Pb, and a support substrate for physically supporting said recording layer is used, comprising the steps of:
(a) in a write-mode, locally heating an arbitrary area of said recording layer up to a temperature equal to or higher than a eutectic temperature of the two principal elements by light beam irradiation, and immediately cooling said recording layer so as to selectively convert only the irradiated portion to a written state in a first metastable phase having a higher reflectivity than an erased state in an equilibrium phase, thus allowing information to be written;
(b) in an erase-mode, cooling a portion in the written state after heating it to a temperature lower than that in the write-mode so as to convert the portion to the erased state; and
(c) in a read-mode, radiating a light beam of power lower than that of the erasing beam onto said recording layer and detecting that a reflected light intensity from an area of the written state is greater than that from other portions of the erased state, thus allowing information to be read.

* * * * *